July 1, 1941.  A. RAMSEY  2,247,700
REPEATING OR RECLOSING CUTOUT
Filed Aug. 16, 1934  6 Sheets-Sheet 2

Inventor:
Allan Ramsey
By Brown, Jackson, Boettcher & Dienner
Attys.

July 1, 1941.    A. RAMSEY    2,247,700
REPEATING OR RECLOSING CUTOUT
Filed Aug. 16, 1934    6 Sheets-Sheet 3

Inventor:
Allan Ramsey.
By Brown, Jackson, Boettcher + Dienner
Attys.

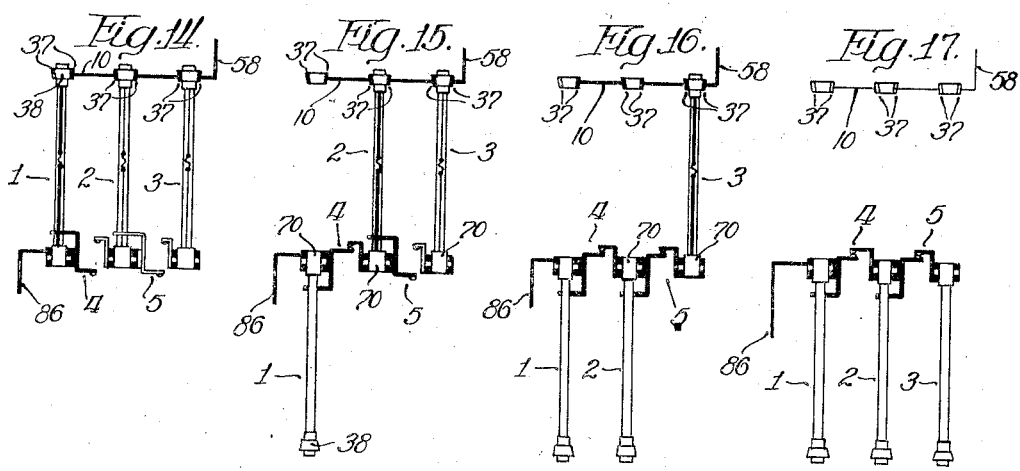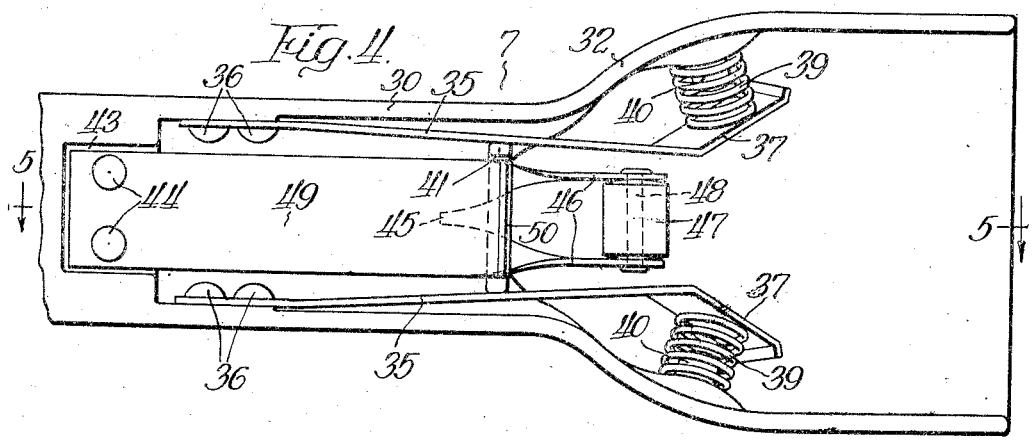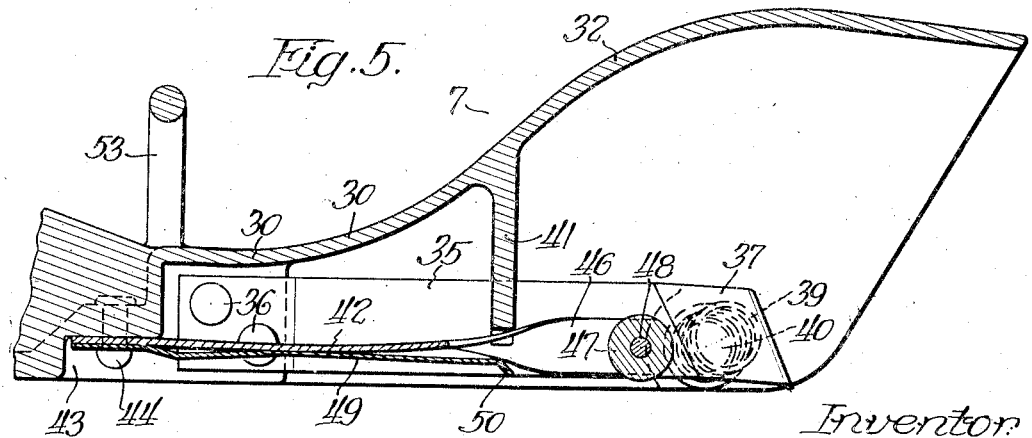

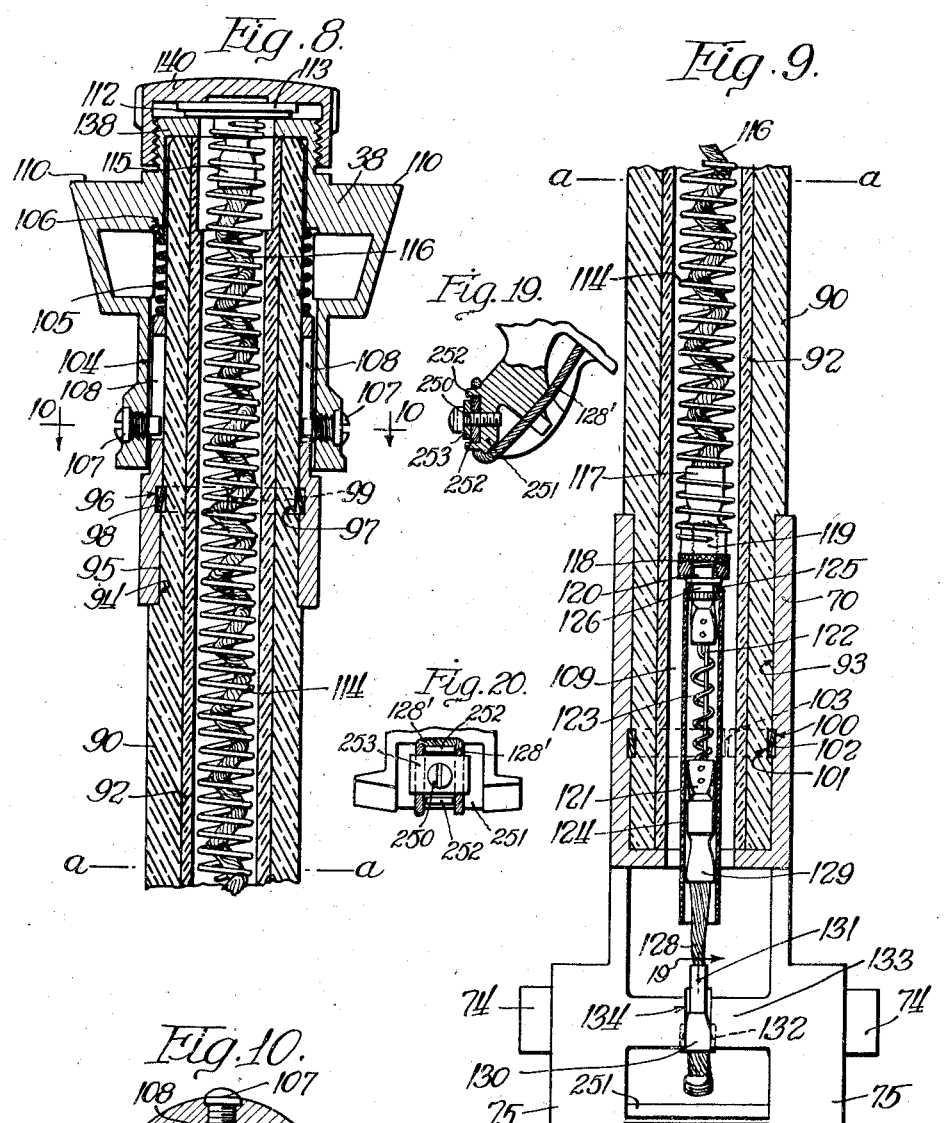

July 1, 1941.　　　A. RAMSEY　　　2,247,700
REPEATING OR RECLOSING CUTOUT
Filed Aug. 16, 1934　　　6 Sheets-Sheet 6

Inventor:
Allan Ramsey
By Brown, Jackson, Boettcher & Dienner
Attys.

Patented July 1, 1941

2,247,700

UNITED STATES PATENT OFFICE 2,247,700

REPEATING OR RECLOSING CUTOUT

Allan Ramsey, Evanston, Ill., assignor to Schweitzer & Conrad, Inc., Chicago, Ill., a corporation of Delaware Application August 16, 1934, Serial No. 740,057

100 Claims. (Cl. 200—126)

My invention relates to a repeating or reclosing cutout for opening a high voltage circuit subject to overloads or shorts and thereafter automatically reclosing the circuit.

In the distribution of electrical power, continuity of service has become a great factor. Service interruptions on power transmission or distribution lines occur from various causes and under various conditions. A large majority of interruptions to service are caused by the occurrence of temporary or transitory overloads or shorts.

Fuses, circuit breakers, or such other safety devices as are in common use are generally designed to open the circuit promptly upon the occurrence of an overload to avoid extending the service interruption toward the source of power. They best serve their function as protective devices in causing interruption of current flow as quickly as it is possible to determine the existence of current flow in excess of that which it is safe for the line to carry. They are intended and designed to operate as soon as the current has attained an excessive value, but they are not able to differentiate between a temporary or transitory overload or short and a permanent one. Even if they were, it might not be safe to permit the circuit to remain closed during the entire interval of the overload or short, even though only of a temporary or transitory character.

In a large percentage of interruptions of service, or outages, the cause is only temporary, such, for example, as wires swinging together, a tree which is falling to ground coming across the lines, flash-over of an insulator due to a voltage surge produced by atmospheric electricity, or switching operations on connected circuits, etc. Hence, if a line is protected by a device without reclosing characteristics, the service is interrupted by an overload or short and remains interrupted even if the cause is self-clearing in character, and when the trouble man comes on the job to reestablish service he finds that the trouble has cleared itself and no longer exists.

The primary object of my present invention is to provide a simple and reliable reclosing cutout for the service above described.

While the particular embodiment which I shall described hereinafter in connection with the drawings employs fuse devices of the drop-out expulsion type, it is to be understood that the invention is not limited in all respects to use of these devices but may employ all similar or equivalent devices as suitable or desired.

According to one phase of my invention the respective fuse devices are hinged at their lower ends to swing downwardly to open position upon interruption of current flow or when the fuse blows. Latch devices are provided for latching the upper ends of the fuse devices to the upper contacts and these latch devices are released upon interruption of current flow or when the fuse blows.

Another object is the provision of a simple and improved reclosing device comprising, in its more specific aspects, a reclosing contact means connected to the lower end one of the fuse devices and a reclosing lever pivoted in position to be operated by the opening movement of the other fuse device and provided with a contact arm which is swung into reclosing engagement with the contact means connected to said first fuse device for reclosing the circuit through said first fuse device automatically upon blowing of the other fuse device.

Another object is the provision of improved reclosing contacts, an improved housing arrangement for these contacts, and an improved arrangement for restraining swinging movement of the reclosing lever.

Another object is the provision of improved latch devices for latching the upper ends of the fuse devices to the upper contacts and improved means for releasing these latch devices upon an interruption of current flow or upon blowing of the fuse devices, and, in its more specific aspects, improved latch releasing means which will act cumulatively with the means for producing a positive gap and extending the same when the fuse blows.

Another object is to provide for normally restraining both the gap producing and the latch releasing means by means of the fuse link.

Another object is to provide an improved upper contact construction and assembly and an improved upper contact bracket and hood for housing and protecting the upper contact and the upper end of the fuse when in closed position.

Another object is to provide an improved lower hinge bracket embodying drop-out and recoil stops for taking the recoil upon blowing of the fuse and preventing dropping out of the fuse from open position as well as from closed and intermediate positions, and permitting lifting of the fuse from its bracket only in substantially full open position.

Another object is the provision of an improved lower contact housed and protected by an overhanging housing portion which constitutes a part of the lower hinge bracket and which also houses and protects the open end of the fuse tube when the fuse is in open position.

The fuse link assembly which I employ is preferably of the type described and claimed in my co-pending application, Serial No. 671,660, filed May 18, 1933, now Patent No. 2,091,453, although reference to this particular fuse link assembly herein is for purposes of illustration and not for purposes of limitation.

Other objects, and the features and advantages of the invention, will be more apparent from the following detailed description, taken in connection with the accompanying drawings, in which:

Figure 4 is a bottom plan elevational view, partially broken away, taken from the bottom of one of the upper contact housings;

Figure 5 is a vertical sectional view, taken on the line 5—5 of Figure 4;

Figures 8 and 9 are parts of a longitudinal sectional view through one of the fuse members; (Figure 9 is to be laid below Figure 8, with the dot-and-dash line $a$—$a$ of Figure 9 on the dot-and-dash line $a$—$a$ of Figure 8).

Figure 10 is a transverse sectional view taken on the line 10—10 of Figure 8;

Figure 14 is a diagram showing the connections of the device with all of the fuse units in closed position;

Figure 15 is a diagram showing the connections after the first fuse has blown and the second unit has been switched into circuit;

Figure 16 is a diagram showing the connections after the second fuse has blown and the third fuse unit has been switched into circuit;

Figure 17 is a similar diagram showing the connections with all of the fuse units blown and in open position;

Figure 18 is a fragmentary side elevational view showing the pivotal mounting of one of the reclosing levers on the lower hinge bracket supporting the same;

Figure 19 is a fragmentary detail section taken on the line 19—19 of Figure 9 and showing the tail extension of a fuse link of a type or manufacture without a conical bushing, anchored to the screw threaded into the cross-web at the lower end of the lower fuse ferrule; and Figure 20 is a fragmentary elevational view of the fuse link anchoring arrangement shown in Figure 19.

Figure 1:
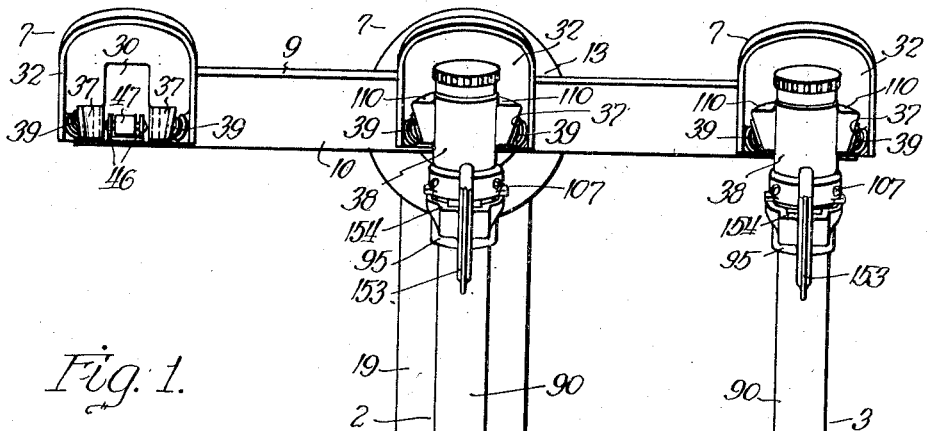
Figure 1 is a front elevational view of an embodiment of my invention.

Referring to the drawings, I provide a mechanism, the purpose of which is to interrupt the circuit automatically upon a rise of current to a value in excess of a predetermined amount, thereafter closing the circuit through another protective device which will remain closed if, in the meanwhile, current flow has been reduced, but which, if current flow is still excessive, will automatically interrupt the circuit and connect in a third safety device to close the circuit, this third device being capable of interrupting the circuit if the current flow is still above a predetermined value. The same principle of operation may be embodied in any desired number of reclosures.

The three protective devices 1, 2 and 3 are preferably, but not necessarily, fuse devices of the drop-out type, each hinged at its lower end to its lower contact and hinge bracket, and, when in closed position, inclined forwardly toward its upper end so that when the latch means at the upper end is released the fuse unit will drop by gravity to open position. Units 1, 2 and 3 are substantially identical, and reclosing switch or transfer devices 4 and 5 are provided between the lower ends of the units 1 and 2 and the units 2 and 3, respectively, for reclosing the circuit through unit 2 upon blowing of the fuse of unit 1, and, thereafter, reclosing the circuit through unit 3 upon blowing of the fuse of unit 2. In the illustrated embodiment, the unit 1 is the first and the unit 3 is the last protective device to be included in the circuit. Obviously, within my invention, any number of safety devices may be employed.

The incoming line connection is made at 6 to the upper contact housing 7 for one of the units 1, 2 or 3, for example, in the illustrated embodiment, to the upper contact housing 7 for the unit 3. The outgoing or load connection is made at 8 to the lower contact and hinge bracket for the unit 1. The circuit may run either way, i. e., either in at 6 and out at 8, or vice versa.

A galvanized steel angle bar 9, provided with a bus copper connector 10, carries the upper contact housings 7 which, with the connector 10, are bolted at 11 to the vertical flange of the bar 9 with the bus connector 10 disposed between the mounted ends of the contact housings 7 and the vertical flange of the bar 9 to provide good electrical connection between the housings 7. Intermediate its ends and, in the illustrated embodiment, by means of the bolts 11 which secure the intermediate contact housing 7 to the bar 9, this bar is secured to the metal cap 12 on the outer end of the insulator 13.

Figure 6:
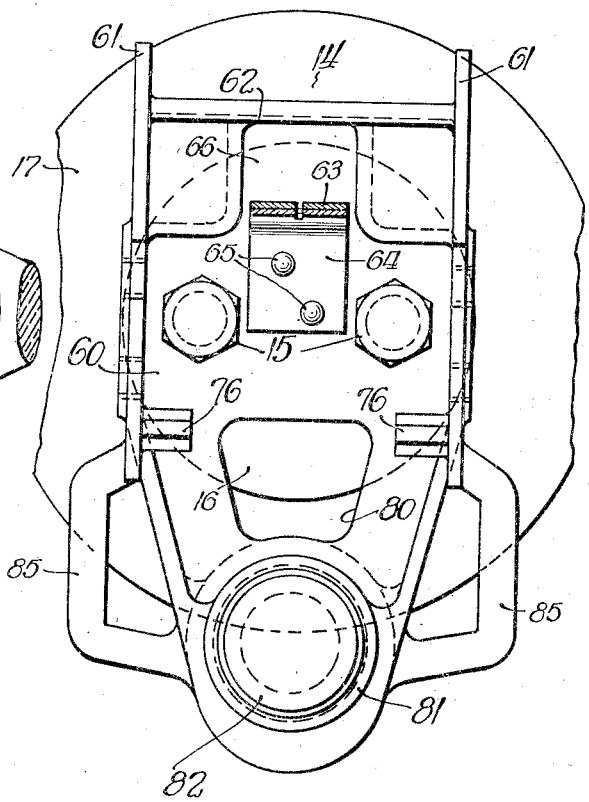
Figure 6 is a front elevational view of one of the lower contact and hinge brackets.

The lower contact and hinge brackets 14 are bolted at 15 (Fig. 6) to the metal caps 16 on the outer ends of the insulators 17. These brackets 14, one for each of the upper contact housings 7, are disposed to support hingedly the lower ends of the units 1, 2 and 3 for swinging movement of these units into and out of engagement with the upper contacts, and so that when the units 1, 2 and 3 are in closed position, said units will be inclined forwardly toward the upper contact housings 7.

Figure 3:
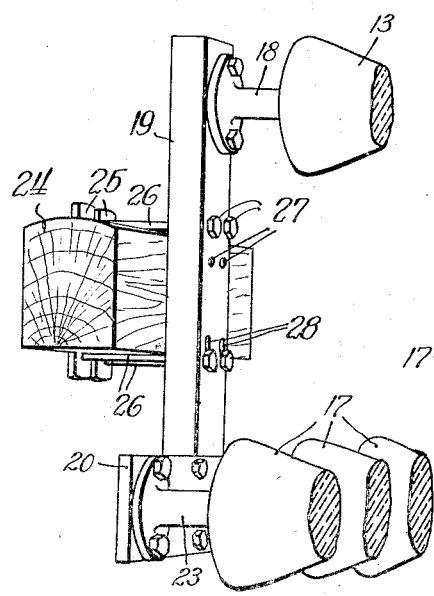
Figure 3 is a fragmentary perspective view showing one form of cross-arm mounting for my present invention.

The insulator 13 has its pin 18 bolted to a support which, in this case, is a rigid galvanized channel iron 19 provided with a rigid cross-plate 20. The attachment of the plate 20 to the channel 19 may include angle members having flanges 21 bolted to the plate 20 and flanges 22 bolted to the sides of the channel 19. The three lower insulators 17 have their pins 23 bolted to the plate 20. The channel 19, with its plate 20, is fixed in vertical position upon a pole, tower, or other structure. In Figure 3, this channel is shown fixed upon a cross-arm 24 by means of clamp plates 25 and bolts 26. Vertically spaced upper bolt holes 27 and vertically elongated lower bolt holes 28 in the channel 19, with slots in the clamp plates 25, allow flexibility in the cross-arm mounting, and also attachment to other supports.

The upper contact housings 7 support and house the upper contacts which engage the contact ferrules at the upper ends of the units 1, 2 and 3 when these units are in closed position, and also roller spring latch mechanisms for locking the upper ends of the respective units in closed position. These contact housings 7 are preferably constructed of cast-hard bronze, or other suitable conducting material. Each has a downwardly opening intermediate channel portion 30, provided at one end with an integral mounting flange 31 for bolting to the angle bar 9, and at its opposite or outer end with an integral sleet hood 32 for protecting the upper contacts and latch mechanisms, as well as the cooperating upper ends of the units 1, 2 and 3 when these units are in closed position.

The upper contact, disposed within each of the upper contact housings 7, comprises a pair of strips 35, preferably formed of hard drawn copper or other suitable conducting material. These contact strips 35 are secured at 36 to the opposite sides of the channel portion 30 of the contact housing 7 and extend forwardly into the hood 32. Their forward ends are spread obliquely at 37 to form contact fingers for contact with the contact ferrule at the upper end of the respective fuse unit. These obliquely spread contact fingers 37 diverge upwardly as shown in Figures 1 and 4 so as to have a slight lifting action upon the upper ferrules 38, or at least so as to offer no restriction to free upward movement of these ferrules in their latch-releasing operation to be hereinafter described. Coiled contact springs 39, of phosphor-bronze wire or other suitable material, are disposed between the backs of the obliquely spread contact ends 37 and the adjacent sides of the hood 32. These springs may be positioned and retained in place on short studs 40 integral with the opposite sides of the hood 32. The springs 39 yieldingly force the ends 37 of the contacts 35 into firm contacting engagement with the contact ferrule 38 when the fuse unit is closed. The force of each spring 39 acts along or intersects the line of contact between the obliquely spread clip finger 37 and the contact ferrule 38. And the contact has a spring action, tensioned by the engagement of the upper end of the fuse unit therewith, which tension has at least a component of action in the direction of opening movement of the fuse unit to initiate and assist in swinging the unit to open position when the latch for the upper end of the fuse is released. A transversely disposed rib 41, formed integral with the housing 7, depends between the contact strips 35 and limits the movement of the free ends of these strips toward each other under the action of the springs 39, ample clearance being provided between the ends of this rib 41 and the adjacent sides of the contact housing for the desired action of the contact strips 35.

Each of the contact housings 7 also encloses a roller latch mechanism, each of which mechanisms comprises a strip 42 of phosphor-bronze, or other suitable conducting material. At one end this strip 42 extends into a recess 43 opening beyond the adjacent end of the channel portion 30 of the housing 7, and is secured at 44 to the wall of the housing 7 which forms the top of this recess. The opposite end of the strip 42 is slit at 45 to form a pair of fingers 46, which fingers are turned at substantially right angles to the mounted end of the strip 42, and support a roller 47 which turns freely upon a pin 48. The pin 48 is carried by the fingers 46 and may be headed at its opposite ends, or otherwise secured against displacement from these fingers. The roller 47 may be of cold drawn copper rod, or other suitable material, and the pin 48 may be of phosphor-bronze wire, or other suitable material. Upward movement of the roller carrying end of the strip 42 is limited by engagement of this strip with the bottom edge of the tongue 41, which is recessed to receive the turned portions of the fingers 46, and the strip 42 is backed against downward swinging movement of its roller-carrying end by a spring 49 of suitable spring stock. This spring 49 is offset upwardly slightly at one end and secured with the strip 42 to the housing 7 by the rivets or other fastening devices 44. The free end of the spring 49 is preferably turned down at 50 to avoid presentation of a sharp edge to the fingers 46 in the slight wiping action of these fingers on the end of the spring 49 under the action of the roller spring latch.

When the fuse unit is in closed position the latch roller 47 engages a latch hook 51 on the contact ferrule 38 and thereby locks the upper end of the fuse in firm contact with the upper contacts 35. The latch hook 51 is tapered at 52 so that as the fuse is swung to closed position about the hinged mounting at its lower end, the tapered portion of the latch hook will engage over the roller 47 and cam the latch down. As the fuse reaches full closed position the latch roller snaps up into engagement with the hook 51 and locks the ferrule 38 to the contacts 37. The ferrule 38 is held against being lifted by engagement of the hook 51 with the latch roller 47, as will hereinafter appear, and when the fuse reaches closed position full latching engagement of the roller 47 with the hook 51 is assured. The free turning movement of the roller 47 between the fingers 46 eliminates friction in the latch during release and engagement of the upper end of the fuse unit with the upper contacts.

For the purposes of making connection, as at 6, to the upper contact housings 7, each of these housings is provided with an integral arch-shaped bail-like member 53 of substantially circular section. The connector 54 is adapted for application to the top or either side of the bail-like member 53 for making connection from any angle. The housings 7, being connected together electrically through the bus connector 10, the connection at 6 may be made to any one of the housings 7. In the illustrated embodiment, the connection is made to the housing 7 for the unit 3. The particular connector 54 illustrated comprises a generally U-shaped member 55 adapted to straddle the top or either side of the bail 53, and having its legs threaded to receive a nut 56. A clamping member 57 fits between the legs of the member 55 and is connected to the nut 56 to move in and out between these legs as the nut is threaded thereupon. The inner surface of the clamping member 57 is knurled or roughened and, with the connector in place on the bail member 53, the bared end of the line wire 58 is inserted into the member 55 and between the bail 53 and the clamping member 57, and the nut 56 is drawn up to bind the inserted end of the line wire firmly in place against the bail member. The good conductivity of the housing 7 and the good conductivity of the parts connected thereto, and the connections therefor, extend the circuit to the contact strips 35 and also through the roller spring latch mechanism to the contact ferrule 38 when the fuse is in closed position.

The lower brackets 14 are preferably formed of cast hard bronze, or other suitable conducting material. Each has the base 60 which is bolted at 15 to the adjacent insulator cap 16, outstanding sides 61, and a roof 62 which overhangs and protects the lower contacts 63 and the open end of the fuse against rain, snow, sleet and the like when the fuse is in open position. When the fuse is in open position the anchoring rib 251 overlies its open end and further protects the same from the weather. One of the contacts 63 is disposed within each bracket 14. Each of these contacts is preferably formed of a strip of bus copper, or other suitable material, backed by a spring 64 of suitable material, such as spring-tempered phosphor-bronze. The inner ends of the contact 63 and spring 64 are turned vertically and secured to the base 60 by rivets or other fastening devices 65 preferably formed of material of good conductivity.

The roof 62 of the bracket has a forwardly extending channel 66, and the contact 63 is disposed in this channel, extending forwardly therethrough and preferably inclined upwardly slightly toward its outer free end, as shown. The outer end of the contact 63 is turned downwardly with its lower end directed inwardly, and is slotted at 67 to form spring contact fingers 68 for contact, when the fuse is closed, with the contact arm 69 on the lower ferrule 70 of the fuse device. The spring 64, the form of which corresponds generally with the form of the contact 63, is nested within the contact 63 and has its downturned forward end bearing against the contact fingers 68 to force these fingers outwardly into firm contact with the contact arm 69 when the fuse is in closed position. The contact 63 thus has a spring action tensioned by the engagement of the lower fuse ferrule therewith and acting in the direction of opening movement of the fuse to assist in swinging the fuse to open position.

Figure 2:
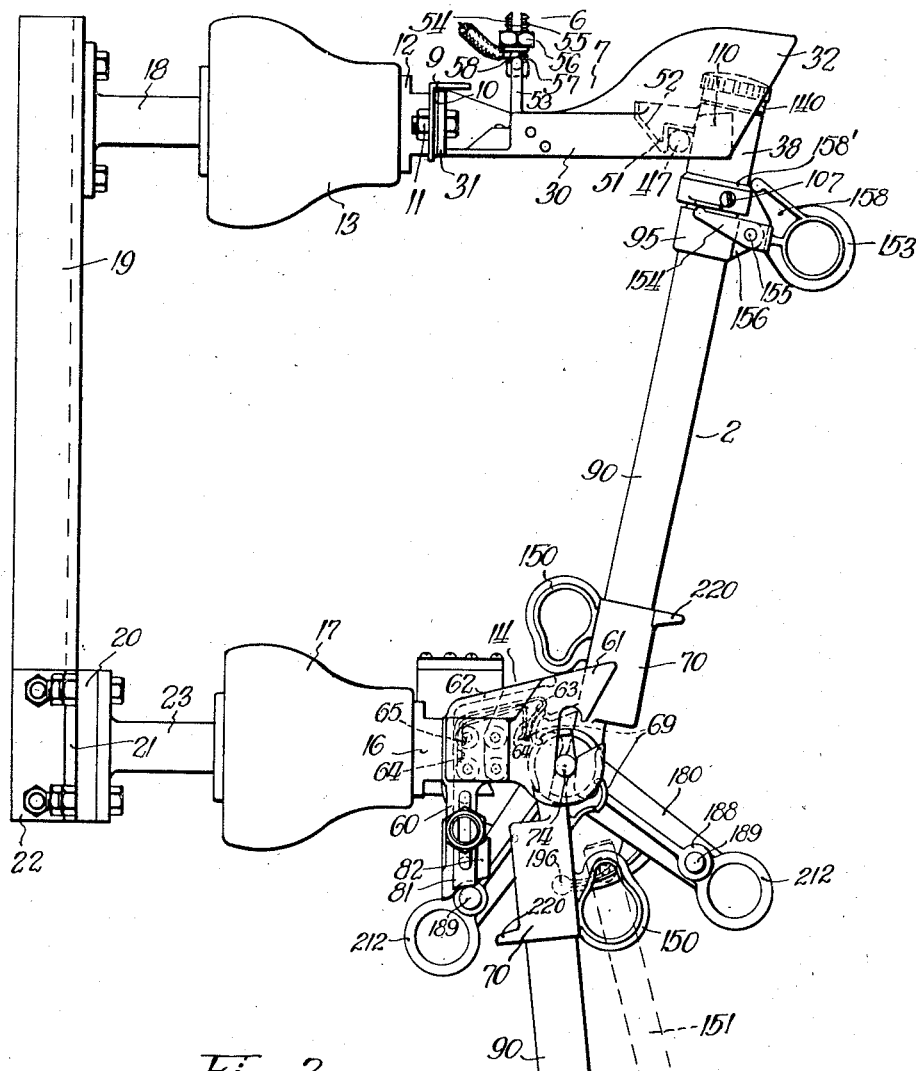
Figure 2 is a side elevational view of the same.

Each of the opposite sides 61 of each bracket 14 has a generally vertical slot 72, shown inclined forwardly slightly toward their upper ends and rounded at the top and square, with rounded corners, at the bottom. Above the lower end of each slot 72, the adjacent side wall 61 has an opening 73 extending from the slot 72 through the front edge of the side wall 61 for entry of the diametrically opposite hinge pins 74, which are formed integral with the lower fuse ferrule 70, into the slots 72 to position in the lower ends thereof as shown in Figure 2, and for removal of these pins from the slots 72. When in position in the slots 72, the pins 74, which are of circular section, are supported to turn freely in the lower ends of the slots 72, and the fuse is thus hingedly supported by the side walls 61 for swinging movement to and from closed position.

Figure 7:
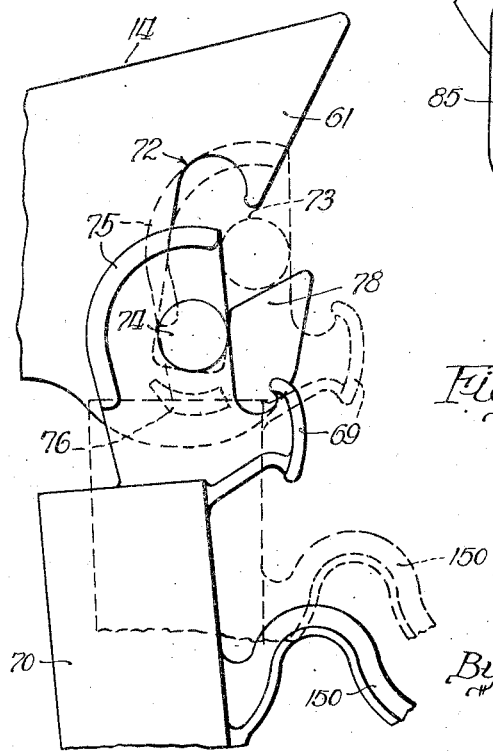
Figure 7 is a fragmentary sectional view, more or less diagrammatic, and showing the hinge mounting of one of the fuse units in the lower bracket and the drop-out and recoil stop arrangement.

Concentric with each pin 74 is a flange 75 integral with the fuse ferrule 70 and curved in the arc of a circle about the axis of the pins 74. The pins 74 project endwise beyond the flanges 75 as shown in Figure 9, and the fuse is applied to the bracket by inverting the same to the position in which the unit 1 is shown in Figure 1, and passing the pins 74 through the openings 73 and into hinged position in the lower ends of the slots 72, as illustrated in Figure 7. The over-all length of the flanges 75 is less than the distance between the side walls 61, so that in applying the fuse these flanges 75 may pass in between the side walls 61. As thus applied, with the lower end of the fuse directed upwardly and the upper end hanging downwardly, the flanges 75 are disposed substantially as shown in Figure 7. The cooperating flanges 76, formed integral with the opposite side walls 61 of the brackets 14 and extending inwardly therefrom, are curved in the arcs of circles about the axis of the pins 74 when these pins are in hinged position in the slots 72, and are of arcuate extent about as shown in Figure 7. The external radius of each flange 76 is slightly less than the internal radius of the adjacent flange 75, and with the fuse in the position of the unit 1, in Figure 1, the flanges 75 are clear of the flanges 76 and the pins 74 of the unit may be readily lifted from the bottoms of the slots 72 and out through the openings 73 to remove the fuse from the bracket.

As soon as the applied fuse is swung upwardly to closed position, however, the flanges 75 travel around the flanges 76 and, by cooperation with the flanges 76, lock the fuse against being lifted out of the hinge support in the closing and opening movements of the fuse. This cooperation of the flanges 75 with the flanges 76 also prevents lifting the fuse out of its hinge support when the fuse is in closed position. The fuse may be lifted out of the hinge bracket and applied thereto only in inverted or substantially full open position. As the fuse reaches full open position, the flanges 75 move to position clear of the flanges 76, and in this position the fuse may be removed by lifting the pins up through the slots 72 and out through the openings 73.

The upwardly hooked portions 78 of the side walls 61 beneath the opening 73, by their upward extension, form stops for preventing the fuse from dropping out of place when in open position. The cooperation of the flanges 75 with the flanges 76, in addition to the functions already described, serve further to take the recoil of the fuse tube upon blowing of the fuse, and with the hooked portions 78 hold the fuse against dropping out from closed position, as well as from positions between closed and open position. Each bracket 14 therefore constitutes a combination hinge and drop-out and recoil stop, as well as a housing for protecting the lower contact and the open ends of the fuse tube when said tube is in open position.

The base 60 of each bracket 14 may be open at 80, and the lower end of the bracket has a tapered socket in which the larger diameter end of a tapered resilient bumper 82, of rubber or other suitable material, is secured. This bumper 82 may be applied by compressing the large diameter end thereof and inserting the same into the small diameter outer end of the socket 81. When inserted, the rubber will expand to the position shown in Figure 11, and the bumper 82 is thereby secured in place. This bumper engages the ferrule 70 as the fuse tube drops to open position, and thereby constitutes a resilient stop for effectively absorbing the impact of the fuse tube when it falls to open position.

For the purpose of making connection, as at 8, to the lower contact and hinge bracket 14, in the illustrated embodiment, each of these brackets 14 is provided with a pair of opposite integral arch-shaped bail-like members 85 of substantially circular cross-section. The connector 54' is similar to the connector 54 at the connection 6, and is adapted for application to the side or bottom portions of the bail-like members 85 for making connection from any angle. By forming these bail-like members on each bracket 14, the brackets are substantially identical and therefore universal, that is, either bracket may be used at the lower end of the unit to which connection is to be made. The connector 54' is similar to the connector 54, and corresponding parts are indicated by primed reference characters corresponding with those applied to the connector 54. The good conductivity of the bracket 14, and the good conductivity of the parts connected thereto and the connections therefor, extends the circuit to the lower contacts 63 which engage the contact arms 69 of the ferrules 70 when the respective fuse devices are closed, and the circuit is also extended partially through the bracket 14 and hinge mounting to the adjacent ferrule 70. With the contacts 63, good contact with the lower fuse ferrules of the respective units is assured when these units are in closed position, without depending on the hinge mountings for the units.

The fuse devices of the respective units 1, 2 and 3 are identical, so that, as with the upper contact housings and upper contact and roller latch assemblies and the lower brackets 14, a description of one will suffice for all. Each of the fuses which I preferably employ in my improved repeating cutout comprises an insulating outer sleeve or tube 90, preferably formed of linen base phenol formaldehyde tubing on a fiber liner 92. At its lower end, the outer diameter of the tube 90 is reduced at 93 to receive the lower contact ferrule 70, which is preferably formed of cast hard bronze, or other suitable conducting material. At its upper end the outer diameter of the tube 90 is reduced at 94 to receive the upper ferrule 95, which is preferably formed of cast hard bronze, or other suitable material.

The ferrules 70 and 95 are preferably secured to the fuse tube in the manner more fully disclosed in my co-pending application, Serial No. 730,075, filed June 9, 1934, now Patent No. 2,108,993. By reference to the above particular fastening of these ferrules to the tube, I do not intend to limit the present invention thereto, but merely refer to the same as a suitable attachment for the present device. Suffice it to say that these attachments of the ferrules to the fuse comprise an external groove 97, formed in the upper reduced end of the tube 90, and a corresponding groove 96 formed in the inner surface of the ferrule 95, which, when this ferrule is in place upon the tube, registers with the groove 97. A conical spring snap ring 98, formed of seamless brass tubing (half hard) and split at 99, engages the shoulder at the lower end of the groove 96 and the shoulder at the upper end of the groove 97, and anchors or secures the ferrule 95 firmly to the tube without screws or the like, and at low cost and in a small space. At the same time, an exceptionally strong joint is provided between the tube and the ferrule. In assembling these parts, the snap ring 98 may be applied to the groove 97 before placing the ferrule upon the tube. Then, as the ferrule is passed down over the upper end of the tube, the larger lower end of the snap ring may be pressed into the groove 97 to permit passage of the ferrule into place, whereupon the ring 98 will spring out into the groove 96 and, by its engagement with the shoulder at the lower end of this groove, will anchor the ferrule firmly in place upon the tube.

The lower end 93 of the tube 90 is provided with a groove 101, similar to the groove 97, and the inner surface of the ferrule 70 is provided with a groove 100 corresponding with the groove 96. A spring snap ring 102, split at 103, similar to the ring 98, locks or secures the lower ferrule 70 firmly in place upon the lower reduced end of the tube 90.

The upper contact ferrule 38, which is formed of cast hard bronze, or other suitable material, is mounted for longitudinal sliding movement upon the upper end of the fuse tube 90, and is counterbored at 104 to receive the upper reduced end of the ferrule 95. A spring wire compression spring 105, coiled about the reduced upper end of the tube 90 and disposed within the counterbore 104, reacts between the upper end of the ferrule 95, secured fixedly to the tube 90, and the shoulder 106 of the ferrule 38, and tends normally to move the contact ferrule 38 upwardly with respect to the tube 90. The ferrule 38 is guided in its longitudinal movement and held against turning upon the tube 90 by three screws 107, threaded through the ferrule 38 and spaced equidistant circumferentially thereof, with their inner reduced ends engaging in longitudinal slots 108 in the ferrule 95. The upward movement of the ferrule 38 with respect to the tube 90 is limited by engagement of these screws 107 with the upper ends of the slots 108.

The spring 105 is normally restrained in compression, and the slidable ferrule 38 is held in the position shown, by the fuse link 109. In the particular embodiment of the invention illustrated in the drawings, the fuse link 109 is provided with a tension or retraction spring 114 and, in this case, the fuse link anchors and restrains the tension spring 114 extended, and, in turn, this spring 114, which is stronger than spring 105, holds the spring 105 in compression. Where the fuse link is not provided with a tension spring such as the spring 114, the fuse link acts directly to hold the spring 105 in compression. The fuse, therefore, may or may not have a tension spring corresponding to the spring 114, and, where there is no such spring 114, the spring 105 acts alone. In either case, it acts to release the latch and to extend the arc upon blowing of the fuse, and where there is a spring 114 the arc extending action is in conjunction with that of the spring 114.

When the spring 105 is restrained in compression by the fuse link and the hinge pins 74 are engaged in the bracket 14 and the fuse swung to closed position, the contact portions 110 of the ferrule 38 move into engagement with the upper contact members 37 and the roller latch device 47 is sprung into engagement with the latch hook 51 to lock the ferrule 38 in contact with the upper contact members 37. When the fuse link is provided with the tension spring 114 and the fuse blows, the spring 114 is released to break the arc within the small chamber defined by the tube 124 and, thereafter, within the large chamber defined by the outer sleeve. Thereafter the spring 105 is released, and projects the ferrule 38 upwardly, thereby moving the latch hook 51 upwardly out of engagement with the latch roller 47, and the fuse drops by gravity to open position.

The fuse link, designated in its entirety at 109, is identical with the fuse link described and claimed in my Patent No. 2,144,707, issued January 24, 1939. The upper cable terminal and spring fastener 112, which is preferably formed from brass rod, or other suitable material, is flanged or headed to form a button 113 which seats upon the upper end of the ferrule 38. The reduced portion depending integrally from the button 113 has a helical groove into which the upper few turns of the coiled fuse spring 114 are threaded, and an integral depending socket 115 receives the upper end of the stranded cable 116 and is pressed securely thereupon. The stranded cable 116, which is preferably of stranded copper, is connected to the lower cable terminal and spring fastener 117 by rigidly securing it in the socketed part 118 thereof, as by inserting it in the socket and pressing or flattening the socket firmly thereon and into secure engagement therewith. The terminal and fastener 117 has a helical groove for threaded engagement with the lower few turns of the spring 114. The terminal 117 is knurled externally at 118, and is tapped or threaded internally at 119 for threaded engagement with the upper end of the upper fuse terminal 120, which is formed of copper or other suitable or preferred material.

The lower fuse terminal 121 is formed of similar material, and this terminal and the terminal 120 are connected by a strain wire or tensile element 122 arranged to bear the mechanical strain. The upper end of the wire 122 is inserted in a socket or opening in the lower end of the terminal 120, and is secured rigidly in place as by punching the stock of the terminal into firm binding engagement with the wire, or by flattening the socket firmly upon the wire. The lower end of the wire 122 is inserted in a socket or opening in the terminal 121 and is secured rigidly in place as by punching the stock of this terminal into firm binding engagement with the wire, or, as before, by flattening the socket upon the wire.

The fuse wire 123 is preferably of silver, or silver alloy, and the strain wire 122 is preferably of nickel-chromium wire. The upper end of the fuse wire 123 is inserted in an opening in the terminal 120 and is secured firmly in place therein, as by punching the adjacent side of the terminal into firm engagement therewith, or flattening the same thereon. The lower end of the fuse wire 123 is inserted in an opening in the terminal 121 and may be secured firmly in place therein, as by punching the adjacent sides of the terminal 121 into firm engagement therewith, or flattening the same thereon. Intermediate its ends the fuse wire 123 is coiled about the strain wire 122.

The fuse wire 123, of silver or other fusible conducting material, preferably one whose oxide is a conductor, and with the advantages set out above and in my co-pending applications above referred to, and the comparatively high resistance strain wire 122, both are completely enclosed and shielded from atmosphere, gases and moisture by a tube 124 formed of fiber or other insulating material. The inner insulating member 124 with the fuse terminals 120 and 121, fuse wire 123, strain wire 122, terminal 129, cable 128 and the conical bushing 130 constitute the fuse link 109. The upper end of the tube 124 closely surrounds the upper fuse terminal 120, and is shrunk or crimped at 125 into the annular groove 126 to close the upper end of the tube 124 against access of atmosphere to the silver fusible element and to secure this tube to the upper fuse terminal 120 so that it will move therewith toward the other end of the outer sleeve when the fusible element fuses. The lower end of the tube 124 passes freely over and closely surrounds the lower fuse terminal 121 and extends down to a position beneath this terminal and into position projecting from the lower end of the fuse tube, as illustrated in Figure 9. The tube 124 offers no impairment to free separation of the terminals 120 and 121 upon blowing of the fuse, yet, at the same time, it is rigid throughout its length and, by its engagement at the upper end with the terminal 120 and its cooperation with the terminal 121, holds the terminals 120 and 121 rigidly against relative lateral movement such as otherwise might result in movement or even crimping or twisting of the fuse wire 123 and/or the strain wire 122.

The inner sleeve 124 closely surrounds the fuse terminals 120 and 121 and the fuse element 123, for accumulation of pressure upon blowing of the fuse. This sleeve 124 is movable from one fuse terminal, namely, the lower terminal 121, for elongation of the arc within the sleeve 124, and is movable from the terminal 121 to release the pressure and permit an outward flow of gases from the sleeve 124. The sleeve 124 and the other terminal 120 are movable further to elongate the arc.

For the purpose of setting the fuse and holding the same set, the lower end of the terminal 121 is provided with a tail extension 128, formed of stranded conducting cable or other suitable material. Several strands of copper cable, preferably tinned, are employed in the illustrated embodiment, although this may, of course, vary widely. The upper end of this cable is inserted in a socket 129 on the lower end of the terminal 121, and this socket is flattened into firm engagement with the cable to secure the same therein. Within its length, the cable 128 is provided with a conical bushing 130, securely anchored in position upon the cable as by flattening the upper end of the bushing at 131 into firm engagement with the cable. The lower conical part of the bushing 130 is engageable with a clip 132 to hold the fuse in set position. The clip 132 is formed by a socket in the transverse web 133 integral with the lower end of the ferrule 70 and having an opening 134 through which the cable 128 or the upper flattened end 131 of the bushing 130 is adapted to be passed to engage the bushing 130 with the socket.

The extension or stranded cable 128 constitutes a tail extension which, with the spring 105 extended and the spring 114 retracted, extends down below the lower end of the fuse casing 90 for setting the fuse and placing the spring 114 under tension and the spring 105 under compression. With the spring 105 extended and the spring 114 retracted, the ferrule 38, in its upper position, and the fuse link 109, applied as shown in Figures 8 and 9, the setting of the fuse is accomplished by grasping the downwardly extending tail extension 128 and pulling the same downwardly against the springs 105 and 114 until the conical bushing 130 is positioned below or clear of the bottom of the clip 132. The cable 128, above the bushing 130, is then passed through the opening 134. Then, upon releasing the tail extension 128, the springs 105 and 114 draw the bushing 130 up firmly into the clip forming socket 132, and this cooperation of the bushing with this socket holds the spring 114 extended and the spring 105 in compression with the fuse in set position.

Where the fuse link is of a type or manufacture which does not have a conical anchoring bushing, then the lower end of such fuse link may be anchored to a screw 250 threaded into the cross-web 251 integral with the lower end of the ferrule 70, as shown particularly in Figures 9, 19 and 20. For the purpose of holding such tail extension 128' (Figures 19 and 20) out of objectionable engagement with the threads of the screw 250, the cross-web 251 is provided with a pair of integral transverse lugs 252. The tail extension 128' is wrapped about these lugs, as shown in Figures 19 and 20, and the lugs are of lengths to hold the tail extension out of objectionable engagement with the threads of the screw 250. The clamping piece 253 is arranged between the lugs 252 and clamped to the sides of the looped or bight portion of the tail extension 128' arranged about the lugs 252.

In either case, that is, with the fuse link anchored to the clip 132 or to the screw 250, a circuit is established from the ferrule 38, upper cable terminal and spring fastener 112, stranded conductor 116, lower cable terminal and spring fastener 117, upper fuse terminal 120, fuse link and strain wire assembly 123, 122, lower fuse terminal 121, stranded conductor 128, bushing 130 and clip 132 to the lower ferrule 70. The tail extension 128, below the conical bushing 130, may be cut off or otherwise removed after the fuse is set, as above described, but it is to be understood that this removal of a part or all of the tail extension for setting the fuse is not necessary within the scope of the present invention.

The fuse shown and described is a spring type expulsion fuse. The ferrule 38 has an upwardly extending portion 138 externally threaded to receive a cap 140, formed of cast hard bronze or other suitable material, and when in place, binding the button 113 firmly upon the upper end of this externally threaded portion of the ferrule 38. The upper and lower sides of the convolutions of the spring 114 may be flattened, as described and claimed in my copending application, Serial No. 730,075, filed June 9, 1934, now Patent No. 2,108,993, and the stranded conductor 116 may be wound into a helix in a direction counter to the lay of the strands of the conductor and placed within a spring 114 wound into a helix in the direction of the lay of the strands of the conductor or counter to the winding of the conductor, as also described and claimed in my co-pending application above referred to, although this is not necessary.

The cylinder or tube 124, which encloses the fuse element 123 and strain wire 122, confines the arc in a very small space and minimizes charring and spattering on the tube liner 92. The attachment of the closed end of this tube to the movable terminal 117 prevents too free access of atmosphere to the fusible link and maintains the closure upon fusing of the link and movement of the movable fuse terminal. The downward extension of the tube 124, below the ferrule 70, may perform the function of giving a visual indication when the fuse has blown.

Upon blowing of the fuse, the spring 114 is released and draws the terminals 117 and 120 and the tube 124 upwardly, which forms and extends the arcing gap first within the tube 124 and then within the outer tube. At the same time, the spring 105 is released and moves the upper contact ferrule 38 upwardly. This upward movement of the contact ferrule 38, by reason of the cooperation of the upper end of this ferrule with the button 113, acts cumulatively with the spring 114 to form and extend the arc rapidly. The upward movement of the contact ferrule 38 disengages the latch hook 51 thereof from the latch roller 47, and the fuse unit drops to open position from the position occupied by the unit 2 in Figure 2 to substantially the position occupied by the unit 1. The opening movement is limited by engagement of the fuse unit with the resilient bumper 82. The dropping of the fuse to open position removes the upper fuse terminal from the upper contacts 37, thereplacing an air gap or air dielectric between t. upper fuse terminal and the upper contacts 31. This removes any possible voltage stress upon the surface of the tube, which is important in outdoor use. At the same time, the dropped down or open position of the fuse semaphores its blown condition.

The spring 114 in collapsing on blowing of the fuse link 109 imparts kinetic energy into certain of its turns and into the terminals 117 and 120 and the remaining parts attached thereto. This kinetic energy is dissipated when the spring 114 goes solid against the cap 140 so that a hammer-like blow is struck against the ferrule 38. This blow tends to dislodge the ferrule 38 if for any reason it has become stuck so that the compression spring 105 is unable to move it to latch releasing position. It will be apparent that the force which applies the hammer blow substantially exceeds the force applied to the fuse link 109 by the spring 114 and may be greater than the force which the fuse link 109 could withstand without being mechanically ruptured. By utilizing the kinetic energy, as set forth, it is unnecessary to construct the fuse link 109 to resist any force except that applied by the spring 114 and yet a greater force than this is available for assisting in the unlatching function.

To reset the fuse after blowing, the blown fuse is removed from the hinge bracket 14. For the purpose of removing the blown fuse from the bracket, the lower ferrule 70 is provided with an integral manipulating eye or ring 150 which, with the fuse in open position as shown in Figure 2, is exposed outwardly to receive the end of a hook stick 151 for lifting the fuse out of the bracket 14 and applying the same to the bracket after the fuse link has been renewed.

For the purpose of manually releasing the latch hook 51 from the latch roller 47, for opening and closing movement of the fuse about its hinge pins 74, with the fuse link operatively in set position, a pull-eye or ring and latch release 153 is provided for each of the fuse units. This pull ring and latch release 153 may be formed of cast hard bronze or other suitable material, and comprises a fork 154 formed integral with the eye 153. The arms of this fork 154 straddle the fixed upper ferrule 95 and the fork is pivoted at 155 to a lug 156 integral with the ferrule 95. The free ends of the arms of the fork 154 engage the enlarged lower end of the ferrule 38 so that, by inserting the end of a hook stick into the eye 153 and exerting a downward pull, the free ends of the fork 154 are swung upwardly (Fig. 2) and move the ferrule 38 upwardly against the tension of the spring 114 to release the latch hook 51 from the latch roller 47. The fuse will then drop to open position, or it may be manipulated to open or closed positions by the engagement of the hook stick in the eye 153. For the purpose of maintaining the arms of the fork 154 against or in proximity to the bottom of the ferrule 38 when the eye 153 is in the position shown in Figure 2, this eye is provided with an integral arm 158 which, as the free ends of the arms 154 of the pull ring and latch release are swung downwardly by the action of the spring 114 when the eye 153 is released, engages the ferrule 38, substantially as shown in Fig. 2, and prevents the arms of the fork 154 from dropping away from the lower end of the ferrule. The arm 158 also, by its downward engagement with the shoulder 158' on the ferrule 38, under the action of the spring 105 on the arms of the fork 154, holds the ferrule 38 down so that it will not be lifted up by engagement with the latch roller 47.

The reclosing switch or transfer device 4 serves to switch the circuit from the fuse 1 to the fuse 2 upon blowing of the fuse 1, and the switch or transfer device 5 serves to switch the circuit from the fuse 2 to the fuse 3 upon blowing of the fuse 2. These switch or transfer devices are positioned in proximity to the lower ends of the respective fuse units and each is operated directly by the opening movement of the fuse. These devices are identical, so that a description of one will suffice for both.

Each of said devices 4 and 5 comprises a bracket arm 175 formed of cast hard bronze or other suitable conducting material and fastened by bolts or screws (not shown) firmly upon and in good contact with the adjacent side wall 61 of the bracket 14. Fixed at 177 in the outer end of the arm 175 is a pin 178 upon which the contact lever 180 is swingably mounted. At its swingably mounted end the lever 180, which is formed of cast hard bronze or other suitable conducting material, has an integral annular flange 181 closed at one end at 182. The opposite end of the flange 181 fits over and turns upon a flange 183 integral with the arm 175. To restrain swinging movement of the lever 180 and hold it from dropping, for example, from the position shown in Figure 11, a pair of dished spring washers 184 are arranged back-to-back within the flange 181 and between the closed end 182 and the flange 183 on the arm 175. These spring washers are clamped to the desired lever-holding relation by a contact nut 185 threaded upon the pin 178 which passes centrally through the washers 184. The nut 185 is castellated at 186 to receive a pin 187 for locking it in place. The pin 187 is engageable in different notches in the outer end of the hub of the nut, which permits adjusting the tension in the washers 184 and securing the nut in any desired adjusted position.

Figure 11:
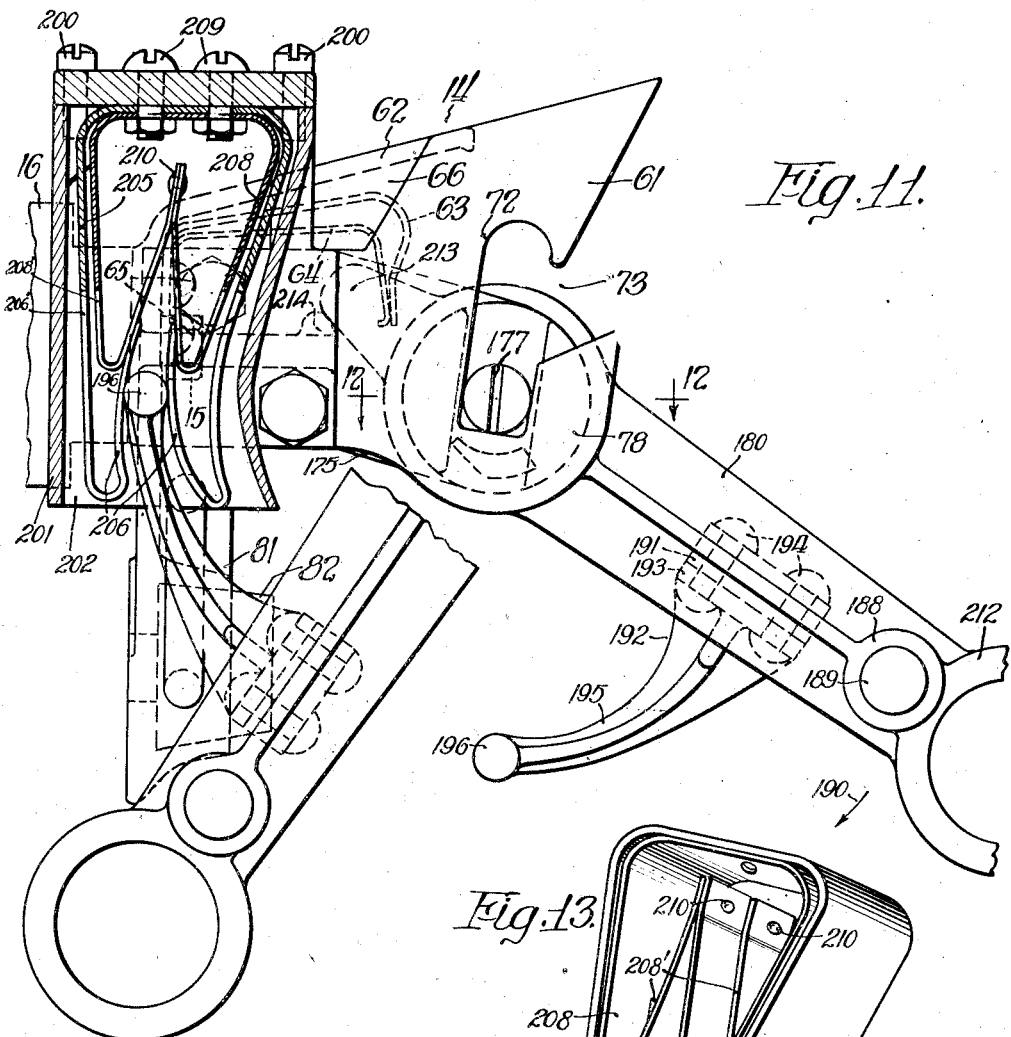
Figure 11 is a vertical section through one of the reclosing housings, taken on the line 11—11 of Figure 1.
Figure 13:
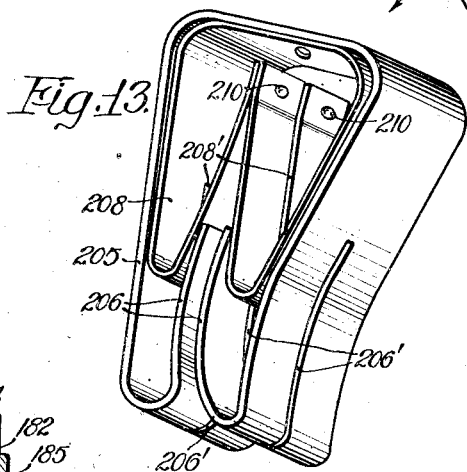
Figure 13 is a perspective view of one of the reclosing contact and spring assemblies.
Figure 12:
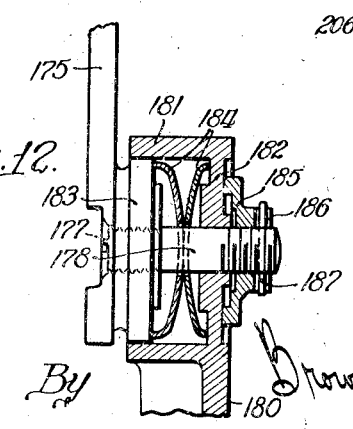
Figure 12 is a detail sectional view through the pivotal mounting for one of the reclosing levers, taken on the line 12—12 of Figure 11.

Secured as by pressed fit in a socket 188 in one side of the lever 180, toward its outer end, is a pin 189. In the case of the switch or transfer device 4 this pin 189 projects, when the lever 180 is positioned as shown in Figure 11, across the path of opening movement of the fuse 1. When the fuse element of the fuse 1 blows, the latch at the upper end is released and the fuse drops by gravity to open position. Toward the limit of the opening movement of the fuse the lug 220 on the ferrule 70 strikes the pin 189 and swings the lever 180 in a clockwise direction about its pivot 178, as indicated by the arrow 190 in Figure 11.

Intermediate its ends the opposite side of the lever 180 is provided with a lug 191 formed integral therewith and projecting laterally therefrom. A contact arm 192 has the free end of its flat leg 193 secured, as by means of rivets 194, firmly to the lug 191 and in good contact therewith. The arm 192 is formed of cast hard bronze or other suitable conducting material and its other leg is curved as shown at 195 in Figure 11, and the free end of this curved leg of the contact arm is provided with a generally cylindrical contact 196.

The opposing side 61 of the next adjacent bracket 14 has a contact bracket 198 fastened firmly thereon and in good contact therewith, as by means of screws or bolts 199. Fastened at 200 to the laterally extending arm of the bracket 198 is a housing 201 for the reclosing contact. The bracket 198 and the housing 201 are formed of cast hard bronze or other suitable conducting material. When the housing 201 is in place its top is closed by the lateral arm of the bracket 198 and its bottom is open at 202 to permit the contact arm 192 to move up into and down out of engagement with the reclosing contact 205 disposed within the housing 201. The housing 201, being open only at the bottom, effectively encloses and protects the reclosing contact 205, as well as the spring 208 and the cooperating contact portion of the reclosing lever when this lever is in reclosing position.

The contact 205, which is preferably formed of bus copper, or other suitable conducting material, is of generally inverted U-shaped form, with its depending legs turned up at 206 and curved on a radius to receive the contact 196 upon movement of the lever 180 to reclosing position. The curvature of the upturned contact portions 206 is preferably in the arc of movement of the contact 196, and the arm 192 is preferably curved in the arc of movement of the contact 196, so as to clear the lower overlapping ends of the reclosing contact 205 when the contact 196 is in reclosing engagement with the contact 205. The upturned contact ends 206 are normally spaced closer than the width of the contact 196, to be tensioned against the contact 196 upon movement of the same upwardly therebetween. The upper ends of the contact portions 206 are backed by a spring 208 nested within the contact 205 and secured, with this contact, at 209, to the bottom of the lateral arm of the bracket 198. This spring is of generally inverted U-shaped form, with its depending legs converging upwardly and secured together at 210. The V-shaped portion of the spring engages and presses the upper ends of the contact portions 206 toward each other and yieldingly opposes separation of these contact portions under the action of the contact arm. The depending legs of the contact 205 and the upturned contact portion 206 are slotted at 206' to form spring contact fingers for relatively great resiliency of contact with the arm 195. The depending sides and upturned ends of the spring 208 are similarly slotted at 208'.

The outer end of the reclosing contact lever 180 has a hook eye 212 for manually resetting the lever in open position as shown in Figure 11. A radial finger 213, integral with the lever 180, by engagement with an integral stop 214 on the bracket 175 limits the opening movement of the lever 180 in a counter-clockwise direction as viewed in Figure 11 and positions this lever for operation directly by the opening movement of the associated fuse.

With the parts in the positions shown diagrammatically in Figure 14, the line wires connected at 6 and 8, and the levers 180 in the position shown in Figure 11, the operation is as follows:

Upon blowing of the fuse 1 the spring 114 is released and the upper fuse terminal 120 and inner insulating member 124 are moved upwardly to lengthen the arc first within the bore of the inner insulating member 124 and later within the bore of the outer insulating tube. At the same time the spring 105 is released and this spring moves the upper ferrule 38 upwardly along the upper end of the tube of the fuse 1 to release the hook 51 from the roller latch 47. This spring 105 acts cumulatively with the spring 114 to form and extend the arc. Upon release of the latch at the upper end of the unit 1 this unit drops by gravity to open position and toward the limit of its opening movement the lug 220 on the lower ferrule 70 swings toward and overrides the pin 189 and swings the reclosing lever 180 to reclosing position with the contact pin 196 engaging the reclosing contact 206 within the housing of the next unit 2. The circuit is thereby switched automatically to the next fuse unit 2. The overriding of lug 220 on pin 189 prevents the fuse trunnions 74 from jumping out of the slot 73 after flanges 75 and cams 76 drop out of register. The fuse tube swings until it hits bumper 82 carrying arm 180 with it to that point. The fuse tube drops back to its lowermost or substantially vertical position, disengaging lug 220 from pin 189.

This second unit 2 will remain closed if, in the meanwhile, current flow has been reduced, but if current flow is still excessive this device 2 blows and the upper ferrule moves upwardly to release the latch at the upper end of the tube. The fuse tube 2 thereupon drops to open position and by its opening movement closes the switch 5 and thereby automatically switches the circuit to the next fuse unit 3. This third unit 3 is capable of interrupting the circuit in the manner of the units 1 and 2 if the current flow is still excessive, and in such case drops to the open position shown in Figure 17.

To reset any one or all of the blown fuse units a hook stick is applied to the eye 150 and the fuse unit lifted from its bracket 14. The blown fuse link is replaced with a new fuse link, which is set with the spring 105 compressed, the spring 114 extended, and the tail extension secured to the clip 132. The fuse is then mounted in inverted position in its bracket 14 and swung upwardly to engage its upper end with the upper contact means, whereupon the latch at the upper end operates to latch the fuse in closed position. The hook stick is engaged with the eyes of the reclosing levers 180 and these levers swung to open position substantially as shown in Figure 11.

If it is desired to open one or more of the fuse units with the fuse links in set condition and without being blown, the operator applies the hook stick to the eye 153 and by downward pull on the same moves the ferrule 38 upwardly to release the hook catch 51 from the latch 47. The fuse unit then drops, or may be swung downwardly to open position and back to closed position, manually, as desired.

While I have shown and described my invention with reference to the particular details of construction of one embodiment, it is to be understood that the invention may appear in different forms and with modifications and variations such as will suggest themselves to one skilled in the art, and it is to be understood that I consider all such modifications and variations to be included within the scope of my invention.

I claim:

1. In combination, an upper contact, a lower contact, a fuse having contacts engageable with said upper contact and lower contact respectively and hinged at its lower end to swing solely by angular motion about said hinge downwardly to open position, and switch means in proximity to the lower end of said fuse and closed directly by the continued movement of the fuse when it swings downwardly about said hinge to open position.

2. In combination, upper contacts, lower contacts, fuse devices having contacts engageable with said first contacts and hinged at their lower ends to swing solely by angular motion about said hinge downwardly to open position, reclosing contact means connected to the lower contact for one of said fuse devices, a reclosing lever pivoted adjacent the lower end of another of said fuse devices and provided with a contact connected electrically with the lower contact for said latter fuse device, and means on said reclosing lever and adapted to be positioned in the path of downward swinging movement of said fuse device for swinging the contact of said lever into engagement with said reclosing contact means by the downward swinging movement of said fuse device.

3. In combination, a pair of lower brackets, a pair of fuse devices one hinged to each of said brackets to swing downwardly to open position, a reclosing contact housing secured to one of said brackets and comprising a weather protection for the reclosing contacts therein, a reclosing contact within said housing, a reclosing lever pivoted to the other bracket and having means adapted to be positioned in the path of downward swinging movement of the adjacent fuse device, and a contact carried by said lever and swingable into and out of the reclosing contact housing and into and out of engagement with the reclosing contact therein.

4. In combination, upper contacts, lower contacts, fuse devices having contacts engageable with said first contacts and hinged at their lower ends to swing downwardly to open position, a reclosing contact connected to the lower contact for one of said fuse devices, a reclosing lever pivoted adjacent the lower end of another of said fuse devices and provided with a contact connected electrically with the lower contact of said latter fuse device and swingable into engagement with the reclosing contact by the downward swinging movement of the fuse device, latch devices for latching the upper ends of the fuse devices to the upper contacts, and ferrules slidable upon the upper ends of said fuse devices and having latch means engageable with said latch devices, the latch means on said ferrules being released from said latch devices by upward sliding movement of said ferrules on said fuse devices.

5. In combination, an upper contact, a lower contact, a fuse having contacts engageable with said first contacts and hinged at its lower end to swing downwardly to open position, a contact housing in proximity to the lower end of the fuse, a contact in said housing said housing comprising a weather protection for the contact therein, and a lever pivoted in proximity to the lower end of the fuse and having a contact swingable into engagement with said last contact by the opening movement of the fuse.

6. In combination, a fuse comprising a fuse tube, a contact ferrule on said tube, means for latching the fuse to a cooperating contact, and means for moving said ferrule longitudinally on said tube to release said latching means.

7. In combination, a fuse comprising a fuse tube, a contact ferrule movable on the upper end of said tube, means for latching the upper end of the fuse to a cooperating contact, and a compression spring reacting against said ferrule for moving the same upwardly along said tube to release said latching means.

8. In combination, a fuse comprising a fuse tube, a contact ferrule movable on the upper end of said tube, means for latching the upper end of said fuse to a cooperating contact, a compression spring reacting against said ferrule for moving the same upwardly along the tube to release said latching means, a contact ferrule on the lower end of the tube, and a fuse link connected electrically between said ferrules and restraining said compression spring.

9. In combination, a fuse comprising a fuse tube, a contact ferrule movable on the upper end of said tube, means for latching the upper end of said fuse to a cooperating contact, a compression spring coiled about said tube and reacting against said ferrule for moving the same upwardly along the tube to release said latching means, a contact ferrule on the lower end of the tube, a fuse link connected electrically between said ferrules and restraining said compression spring, said fuse link comprising an inner insulating member having a bore of relatively small diameter, terminals, and a fuse element closely surrounded by the bore of the inner member, one terminal forming a permanent closure for one end of the bore of the inner insulating member, and means for moving said latter terminal and the inner insulating member in the direction of expansion of said compression spring to lengthen the arc first within the bore of the insulating member and later within the bore of the fuse tube upon blowing of the fuse.

10. In combination, a fuse comprising a fuse tube, a contact ferrule movable on the upper end of the tube, a contact ferrule on the lower end of the tube, a fuse link connected electrically to said ferrules and anchored at one end on the upper ferrule, said link comprising an inner insulating member having a bore of relatively small diameter, terminals, and a fuse element closely surrounded by the bore of the inner member, one terminal forming a permanent closure for one end of the bore of the inner insulating member, a retraction spring connected between said last terminal and the anchored end of the fuse link for moving said latter terminal and the inner insulating member in a direction to lengthen the arc first within the bore of the inner insulating member and later within the bore of the fuse tube upon blowing of the fuse, and a compression spring coiled about the tube and reacting against the movable ferrule to move said ferrule and the anchored end of the fuse link in the direction of retraction of said first spring upon blowing of the fuse, said last spring being normally restrained by said fuse link.

11. In combination, a fuse tube, a ferrule fixed upon said tube, a second ferrule movable along the tube and having a portion fitting over said first ferrule, said first ferrule being slotted longitudinally, means on said second ferrule and engaging the slotted portion of said first ferrule for guiding said second ferrule longitudinally along the tube, and a compression spring reacting between said ferrules for moving the second ferrule longitudinally along the tube.

12. In combination, a fuse tube, a ferrule fixed upon said tube, a second ferrule movable along the tube and having a portion fitting over said first ferrule, said first ferrule being slotted longitudinally, means on said second ferrule and engaging the slotted portion of said first ferrule for guiding said second ferrule longitudinally along the tube, a compression spring reacting between said ferrules for moving the second ferrule longitudinally along the tube, and a fuse link extending through the tube and anchored to said second ferrule normally to restrain said spring.

13. In combination, a fuse tube, a contact ferrule slidable on said tube, and laterally extending latch means on the outside of said contact ferrule.

14. In combination, a fuse tube, a contact ferrule movable on said tube, a fuse link having a button seated on the end of the movable ferrule, a cap threaded on said ferrule over said button for clamping the same to said ferrule, and a spring reacting against said ferrule for moving the ferrule and the anchored end of the fuse link longitudinally of the fuse tube.

15. In combination, a contact bracket, a pair of laterally spaced contact members secured to said bracket and having free ends spread obliquely, and coiled springs between the obliquely spread ends of said contact members and the sides of the bracket.

16. In combination, a contact bracket, a pair of laterally spaced contact members secured to said bracket and having free ends spread obliquely, coiled springs between the obliquely spread ends of said contact members and the sides of the bracket, and a latch device secured to said bracket in position between said contact members.

17. In combination, a contact bracket, a pair of laterally spaced contact members secured to said bracket and having free ends spread obliquely, coiled springs between the obliquely spread ends of said contact members and the sides of the bracket, a latch device secured to said bracket in position between said contact members, and a hood on said bracket protecting the obliquely spread ends of said contact members and said latch device.

18. In combination, a bracket having a contact, a fuse movable into and out of engagement with said contact, latch means on said fuse, a latch arm secured to said bracket, and a latch roller carried by said arm and engageable with the latch means on the fuse.

19. In combination, a contact bracket having a hood, a contact within said hood, a latch within said hood, a fuse hinged at its lower end and swingable at its upper end into and out of said hood, a contact ferrule slidable on the upper end of the fuse and engageable with the contact within the hood, and latch means on said ferrule for engagement with the latch means in the hood.

20. In combination, a pair of laterally spaced spring contacts having obliquely turned ends, and a fuse tube swingable into and out of engagement with the spring contacts, said tube having a contact provided with surfaces cooperating with the obliquely turned ends of the contacts, said obliquely turned contact ends having faces oblique to the axis of the fuse tube and having a spring action tensioned by the engagement of the fuse therewith and acting in the direction of opening movement of the fuse to permit free motion of the fuse tube contact axially and laterally away from said spring contacts.

21. In combination, a bracket, a contact connected to said bracket, a bail member integral with said bracket and a U-shaped bolt hooked over and slidable along said bail for connecting a conductor to the bracket from different angles.

22. In combination, a hinge bracket having side walls provided with generally vertical slots opening forwardly above their lower ends, a fuse tube provided with a ferrule having hinge pins adapted to be passed through said forwardly directed openings and into hinged position in the lower ends of said slots, and cooperating flanges on the ferrule and on the sides of the bracket overlapping axially of the hinge pins for taking the recoil upon blowing of the fuse and preventing lifting of the fuse from the bracket except in open position of the fuse.

23. In combination, a hinge bracket having side walls provided with generally vertical slots opening forwardly above their lower ends, a fuse tube provided with a ferrule having hinge pins adapted to be passed through said forwardly directed openings and into hinged position in the lower ends of said slots, and cooperating flanges on the ferrule and on the sides of the bracket for taking the recoil upon blowing of the fuse and preventing lifting of the fuse from the bracket except in open position of the fuse, said flanges being curved in the arcs of circles about the axis of the hinge pins and the flange on the ferrule clearing the flanges on the bracket in open position of the fuse so that the fuse may be lifted from the bracket.

24. In combination, a hinge bracket having side walls provided with generally vertical slots opening forwardly above their lower ends, a fuse tube provided with a ferrule having hinge pins adapted to be passed through said forwardly directed openings and into hinged position in the lower ends of said slots, cooperating flanges on the ferrule and on the sides of the bracket for taking the recoil upon blowing of the fuse and preventing lifting of the fuse from the bracket except in open position of the fuse, said flanges being curved in the arcs of circles about the axis of the hinge pins and the flange on the ferrule clearing the flanges on the bracket in open position of the fuse so that the fuse may be lifted from the bracket, and a contact member mounted on said bracket and having a spring action tensioned by the engagement of the fuse therewith and acting in the direction of opening movement of the fuse to aid in swinging the fuse to open position, said bracket having an overhanging housing protecting the contact and the end of the fuse tube when the fuse is in open position.

25. In combination, a bracket arm having a flange, a pin carried by said arm, a reclosing lever swingable about the axis of said pin and having an annular flange coaxial with said pin and fitting over and turning on the flange on said bracket, and means disposed within the flange on said reclosing lever and acting between said lever and the flange on said bracket for restraining swinging movement of said lever.

26. In combination, a contact, a fuse hinged at its lower end and having at its upper end a movable ferrule engageable with said contact, latch means for latching the upper end of said fuse to said contact, latch means on said movable ferrule for engagement with said first latch means, means yieldingly holding said latch means in engagement and said ferrule against releasing movement, and a manually operable arm pivoted to said fuse and cooperable with said movable ferrule to move same manually to released position.

27. In combination, a contact, a fuse tube hinged at its lower end and having at its upper end a movable ferrule engageable with said contact, latch means for latching the upper end of said fuse to said contact, latch means on said movable ferrule for engagement with said first latch means, means yieldingly holding said latch means in engagement and said ferrule against releasing movement, a second ferrule fixed upon said tube adjacent said first ferrule, a manually operable arm pivoted to said second ferrule and cooperable with said first ferrule to move same manually to released position, and means on said arm for maintaining the same in position for cooperation with said first ferrule and for locking the ferrule against upward movement by engagement of the latch means thereon with said first latch means.

28. A contact comprising a conducting strip of generally U-shaped form with the lower ends of its depending legs turned upwardly in spaced relation to form contact portions for receiving and engaging a movable contact, and a spring of flat stock having an inverted V-shaped portion having the portions at the apex fixed together and having its upwardly converging sides engaging the upper ends of the upturned contact portions of said contact to tension the same.

29. In combination, a contact terminal, a fuse comprising a fuse tube having a contact engageable with said contact terminal, a fuse link disposed within said tube and comprising an inner insulating member having a bore of relatively small diameter, terminals, and a fuse element closely surrounded by the bore of the inner member, and means for forming and extending the arc first within said inner member and later within the fuse tube upon blowing of the fuse, said fuse being movable out of engagement with said contact terminal and to open position to interpose an air dielectric between the fuse and said contact terminal.

30. In combination, a contact terminal, a fuse comprising a fuse tube having a contact engageable with said contact terminal and arranged to drop to open position, means for latching the fuse to said contact terminal, a fuse link disposed within said fuse tube and comprising an inner insulating member having a bore of relatively small diameter, terminals, and a fuse element closely surrounded by the bore of the inner member, one terminal forming a permanent closure for one end of the bore of the inner insulating member, means for moving said latter terminal and said inner insulating member to extend the arc first within said inner member and later within the fuse tube upon blowing of the fuse, and means for releasing said latch means to permit the fuse to drop to open position and interpose an air dielectric between the fuse and said contact terminal.

31. In combination, a fuse tube, a fuse link within said tube, a spring within said tube for extending the arc at said fuse link upon blowing of the fuse, and a separate spring externally of said tube and arranged to act cumulatively with said first spring to extend the arc upon blowing of the fuse.

32. In combination, a fuse tube, a fuse link within said tube, said link comprising an inner insulating member defining an arcing chamber of relatively small diameter, a spring anchored at one end and adapted for extending the arc first within the inner arcing chamber and later within the fuse tube upon blowing of the fuse, and a separate spring normally restrained by said first spring, said second spring acting, upon release of said first spring, to move the anchored end of said first spring in a direction further to extend the arc.

33. In combination, a fuse tube, a fuse link within said tube, a tension spring within the tube for extending the arc at said fuse link upon blowing of the fuse, and a compression spring externally of said tension spring for thereafter further extending the arc.

34. In combination, a stationary contact terminal, a dropout fuse engageable therewith at one end, a latch for latching the dropout fuse to said contact terminal, a fuse link in said fuse including a sleeve of insulation and a fusible element therein, and a spring restrained by said fuse link and operable upon blowing thereof to release said latch and extend the arc.

35. In combination, a fuse tube, a contact ferrule movable on said tube, latch means for said contact ferrule, a compression spring externally of the fuse tube for releasing said latch means, and a tension spring within the fuse tube for extending the arc and normally restraining said first spring.

36. In combination, a fuse tube hinged at one end, a contact ferrule slidably movable on said tube at the other end, and a spring contact engageable with said ferrule upon opposite sides thereof and having a component of action upon said ferrule in the direction of the sliding movement of the ferrule.

37. In combination, a contact terminal, a fuse tube movable to open and closed positions and provided with a slidable ferrule engageable in closed position with said terminal, latch means for latching said ferrule to said terminal, said latch means being released by upward sliding movement of said ferrule, said terminal comprising spaced yielding contact members having free ends spread obliquely for engagement with the ferrule and diverging upwardly.

38. In combination, a contact terminal, a fuse tube swingable to open and closed positions and having a contact ferrule movable thereon and engageable with said contact terminal in closed position of the fuse, a latch for latching the fuse in closed position, a spring for moving the ferrule upwardly along the fuse to release said latch, and means for holding said ferrule against upward movement on the fuse by the engagement of the latch in closing the fuse.

39. In a device of the class described, the combination of a vertically mounted fuse tube automatically releasable at its upper end, said tube having a trunnion at its lower end, a switch operating lever pivotally mounted adjacent said trunnion and having means adapted to be engaged by the tube when the same swings downwardly for moving the lever angularly, said lever bearing a contact member normally below said pivot, and a separately supported switch jaw facing downwardly and aligned with said contact member, a sleet hood for said jaw, said hood opening downwardly said contact member being caused to rise under the hood into engagement with said jaw and to be gripped thereby as the lever is carried downwardly by said fuse tube.

40. In combination, a drop-out fuse tube mounted on a trunnion pivot at its lower end for swinging motion solely about said trunnion, a switch having a pivoted operating means in the path of movement of said tube when it swings about said trunnion, said switch comprising a pair of jaws and a contact adapted to be forced between and gripped by the jaws by swinging of said tube past its lowermost position, said tube returning by gravity to its lowermost position and being then disconnected from said switch operating means.

41. In a drop-out fuse, a fuse tube having an open ferrule with a fixed trunnion at its lower end, a slidable closed ferrule at its upper end, a fuse link connecting the two ferrules and holding the upper ferrule against movement, means limiting the travel of the upper ferrule, said upper ferrule having contact surfaces tapered horizontally and vertically, and cooperating spring contacts also tapered horizontally and vertically, whereby movement of the ferrule vertically or horizontally releases it from the spring contact.

42. The combination of claim 41 with a stationary detent and a latch mounted on the ferrule, said latch being released from the detent upon upward movement of the upper ferrule.

43. The combination of claim 41, characterized by the provision of a spring normally restrained by the fuse link for releasing said latch from said detent upon blowing of the fuse link.

44. In a drop-out fuse, a stationary contact, a pivoted fuse tube having an open lower end and a cap at the upper end, a stationary contact for engaging said cap, said tube being provided with a ferrule at its lower end and a pivotal mounting to permit the tube to swing outwardly and downwardly to disconnect said cap from said stationary contact when the fuse link melts, and a spring stressed fuse link disposed wholly within said tube, said link operating to interrupt current flow through the device before the cap leaves engagement with the stationary contact, whereby arcing between the stationary contact and the cap is avoided.

45. In a circuit interrupting device, two fixed terminals, a fuse tube having outside end terminals, and inside terminals connected with said outside end terminals, a fusible link joining said inside terminals, means for holding said end terminals in contact with said fixed terminals until said fusible link blows, means for tensioning said fuse link and for separating the inner terminals to extinguish the arc promptly when said fusible link blows, means for releasing one end terminal from its corresponding fixed terminal after the fuse blows to introduce an air gap after the arc is extinguished to prevent restoring of the circuit, the tension upon the link being independent of the holding and releasing means.

46. In a circuit interrupting device, a fusible link, means for tensioning the link and for lengthening the arc on blowing to help extinguish it, and means for introducing an air gap in series with the link after the arc is extinguished to prevent restoring of the circuit, the tension upon the link before blowing being independent of the means for introducing the air gap.

47. In a dropout fuse, stationary mounting terminals, a fuse device comprising a fuse tube having a ferrule at one end and a pivotal mounting at its other end cooperating with said mounting terminals, a link comprising a fusible portion, said link connecting said ferrule and said pivotal mounting, a spring lying within the tube for tensioning said fusible portion, said stationary terminals having means for disconnecting the fuse device from one of said terminals to interpose an air gap in series with the tube after the fusible portion blows, and means releasable by blowing of said fusible portion for holding said fuse device in engagement with said terminals, said tensioning spring providing a separation of the ends of the fusible portion upon blowing prior to movement of the tube and at a rate of motion independent of the rate of motion of the tube.

48. The combination of claim 47 wherein the fuse tube has an open end and a closed end, the fusible portion of the link lying near the open end and the tensioning spring being anchored adjacent the closed end whereby the vapors caused upon blowing of the fusible portion are very rapidly expelled from the bore of the tube in a direction opposite that of the travel of the spring.

49. In combination with a fusible link, a fuse tube hinged at its lower end to swing on a single transverse axis and having a tube contact at its upper end movable axially when the fusible link melts, a pair of contact fingers lying on opposite sides of the axis of the tube and engaging the contact and having faces pressing against the contact, each with an axial component of pressure and a lateral component of pressure whereby a good wiping contact is made by forcing the tube contact against said contact fingers, the faces of the contact fingers being oblique to axial motion and to lateral motion of the tube contact, whereby the tube contact is easily freed from the contact fingers when the fusible link melts, and means for moving the contact axially when the fusible link melts.

50. In a dropout fuse, a fuse tube, a pair of mounting contacts one of which provides a pivotal mounting for the tube the other of which provides a catch shoulder, the fuse tube having an upper terminal member provided with a catch shoulder cooperable with the catch shoulder on the contact, said upper terminal member being movable on the fuse tube to release the catch shoulders, a fuse link in said tube connected to said upper terminal member normally holding the said terminal member to prevent disengagement of said shoulders, said link embodying a fusible element and a spring for separating the ends of the element upon melting of the element, and manually operable means for moving the terminal member against the stress of said spring to disengage the shoulders while said element is intact.

51. In a dropout fuse, a mounting contact embodying a catch shoulder, a fuse tube having a terminal member movably mounted on one end thereof and provided with a catch shoulder cooperable with the first catch shoulder for holding said tube terminal member against disengagement from the contact spring means tending to move said shoulders out of engagement, and a spring tensioned link in the tube fastened to the terminal member to hold it against disengaging movement.

52. A repeating fuse construction comprising a plurality of drop-out fuse units, each unit comprising a body portion having stationary contacts, a fuse tube having spaced contacts normally engaging said stationary contacts and hinged at its lower end to swing solely by angular motion about said hinge downwardly to open position, a fuse link for each fuse tube normally restraining the rotation thereof, and a switch carried by each preceding fuse unit and closable directly by the force due to the rotation of the corresponding fuse tube for connecting the next succeeding fuse unit in circuit.

53. In combination, a contact terminal, a fuse device comprising a fuse tube and a fusible element therein, a sleeve movable on one end of said tube, means for latching said sleeve in contact engagement with said contact terminal, and means controlled by said fusible element and operative on blowing thereof for producing relative movement of said sleeve and said tube to release said latching means.

54. In combination, a contact terminal, a fuse comprising a fuse tube having a contact engageable with said contact terminal, a fuse link disposed within said tube and comprising an inner insulating member having a bore of relatively small diameter, terminals, and a fuse element closely surrounded by the bore of the inner member, and spring means inside of said fuse tube and connected to said link whereby the arc formed on blowing of said fuse element is extended within said fuse tube, said fuse being movable out of engagement with said contact terminal and to open position to interpose an air dielectric therebetween.

55. In combination, a contact terminal, a fuse comprising a fuse tube having a contact at one end engageable with said contact terminal, a fuse link disposed within said tube and comprising an inner insulating member having a bore of relatively small diameter, terminals, and a fuse element closely surrounded by the bore of the inner member, means for forming and extending the arc first within said inner member and later within said fuse tube upon blowing of said fuse element, and latch means slidably mounted on said one end of said fuse tube and releasable on blowing of said fuse element to permit said fuse to move out of engagement with said contact terminal and to open position to interpose an air dielectric between the fuse and said contact terminal.

56. In combination, a stationary contact terminal, a dropout fuse engageable therewith, hinge means for rotatably mounting said dropout fuse about its lower end, a latch at the upper end of said dropout fuse for latching it to said contact terminal, a fuse link in said fuse including a sleeve of insulation and a fusible element therein, and a spring on the upper end of said dropout fuse restrained by said fuse link and operable upon blowing thereof to release said latch and extend the arc.

57. In combination, a stationary contact terminal, a dropout fuse engageable therewith, hinge means for rotatably mounting said dropout fuse about its lower end, a latch at the upper end of said dropout fuse for latching it to said contact terminal, a fuse link in said fuse including a sleeve of insulation and a fusible element therein, and a spring on the upper end of said dropout fuse restrained by said fuse link and operable upon blowing thereof to extend the arc and to release said latch by increasing the distance between said latch and said hinge means.

58. In a dropout fuse, a fuse tube having an open ferrule with a fixed trunnion at its lower end, a slidable closed ferrule at its upper end, a fuse link connecting the two ferrules and holding the upper ferrule against movement, a stationary detent, and a latch mounted on the ferrule, said latch being released from the detent upon upward movement of the upper ferrule.

59. In a dropout fuse, a fuse tube having an open ferrule with a fixed trunnion at its lower end, a slidable closed ferrule at its upper end, a fuse link connecting the two ferrules and holding the upper ferrule against movement, a stationary detent, a latch mounted on the ferrule, and a spring normally restrained by said fuse link for moving the latch upwardly to release it from the detent upon blowing of the fuse link.

60. In combination, a contact terminal, a fuse comprising a fuse tube having a contact engageable with said contact terminal, a fusible element inside of said tube, a spring inside of said tube and interposed between said contact and said fusible element for tensioning the latter and lengthening the arc within said tube formed on blowing thereof, and means responsive to the blowing of said fusible element for releasing the contact engagement between said contact and said contact terminal to interpose an air dielectric therebetween.

61. In combination, a dropout tube releasable on blowing of a fusible element therein, support means for rotatably and removably mounting said dropout tube at its lower end, switch means closed directly by movement of said dropout tube when it rotates downwardly to open position, and means interlocking said dropout tube and said support means while said switch means is being operated.

62. In combination, a dropout tube mounted on a trunnion pivot at its lower end, switch means closed directly by movement of said dropout tube when it rotates downwardly to open position, the trunnion mounting comprising a hooked stationary bearing and a cooperating trunnion on said dropout tube removable from the hooked bearing, and overhanging shoulders on said trunnion mounting cooperating to retain said trunnion in said bearing while said dropout tube is driving said switch means and permitting removal of said dropout tube on movement thereof to a predetermined position.

63. In a dropout fuse, a fuse tube, a pair of mounting contacts one of which provides a pivotal mounting for the tube the other of which provides a catch shoulder, the fuse tube having an upper terminal member provided with a catch shoulder cooperable with the catch shoulder on the contact, said upper terminal member being movable on the fuse tube to release the catch shoulders, a fuse link in said tube connected to said upper terminal member normally holding the said terminal member to prevent disengagement of said shoulders, a spring tensioning said link and biasing said terminal member into engagement with its cooperating contact, and manually operable means for moving said terminal member against the stress of said spring to disengage said shoulders while said link is intact.

64. In combination, a fuse tube, contact means at the upper end of said tube, stationary contact means disposed to be engaged by said contact means on said tube, said contact means engaging in planes approaching the longitudinal axis of said tube, and spring means cooperating with one of said contact means to provide pressure contact engagement therebetween at right angles to said planes in which contact engagement takes place, said contact means on said tube being arranged and adapted to move relative to said stationary contact means in a plane parallel to said longitudinal axis of said tube.

65. In a repeating fuse mechanism, in combination, a pair of dropout fuse devices one of which is normally adapted to be connected in a circuit, a transfer switch actuated by movement of said one fuse device on blowing of its fusible element to connect the other fuse device in said circuit, and means arranged and adapted to prevent the contact members of said transfer switch from rebounding on engagement thereof.

66. In a repeating fuse mechanism, in combination, a pair of rotatably mounted dropout fuse devices one of which is normally adapted to be connected in a circuit, and a transfer switch actuated by movement of said one fuse device on blowing of its fusible element to connect the other fuse device in said circuit, said transfer switch comprising a stationary contact member and a cooperating contact member movable into engagement therewith from underneath.

67. In a repeating fuse mechanism, in combination, a pair of rotatably mounted dropout fuse devices one of which is normally adapted to be connected in a circuit, a transfer switch actuated by movement of said one fuse device on blowing of its fusible element to connect the other fuse device in said circuit, said transfer switch comprising a stationary contact member of jaw-like construction opening downwardly and a cooperating contact member movable upwardly for contact engagement therewith, and a housing in proximity to said stationary contact member constituting a weather protection therefor.

68. In combination, a stationary contact terminal, a dropout fuse device engageable therewith, hinge means rotatably mounting said fuse device about its lower end, a sleeve slidably mounted on the upper end of said fuse device, means for biasing said sleeve upwardly and released on blowing of the fusible element of said fuse device, and latch means carried by and movable with said sleeve for latching said fuse device in operative position, the distance between said hinge means and said latch means being increased to release said fuse device for movement from said operative position.

69. In combination, a stationary contact terminal, a dropout fuse device and a fuse link therein including a sleeve of insulation and a fusible element, a latch at one end of said fuse device for holding it in engagement with said stationary terminal, hinge means for rotatably mounting said fuse device at its other end, and means responsive to the blowing of said fuse link for releasing said dropout fuse device from engagement with said stationary terminal by increasing the distance between said hinge means and said latch.

70. In combination, an upper contact, a lower contact, a fuse having contacts engageable with said upper contact and lower contact respectively and hinged at its lower end to swing solely by angular motion about said hinge downwardly to open position, and rotating switch means having an axis of rotation parallel to the axis about which said fuse swings and actuated directly by the opening movement of the fuse.

71. In a circuit interrupter, in combination, a first and a second stationary terminal, a fuse tube having fuse terminals and a fuse link therein electrically interconnecting them, one of said fuse terminals being in contact engagement with said first stationary terminal, the other of said fuse terminals comprising a metallic sleeve through which said fuse tube is relatively movable and being electrically connected to said second stationary terminal, means for tensioning said fuse link to lengthen the arc on blowing thereof, and means for effecting relative movement between said fuse tube and said sleeve after said fuse link blows to disengage one of said fuse terminals from its stationary terminal, the tension upon said fuse link before blowing being independent of the means for producing the relative movement between said fuse tube and said sleeve.

72. In a circuit interrupter, in combination, a first and a second stationary terminal, a fuse tube having fuse terminals and a fuse link therein electrically interconnecting them, one of said fuse terminals being in contact engagement with said first stationary terminal, the other of said fuse terminals comprising a metallic sleeve through which said fuse tube is relatively movable and electrically connected to said second stationary terminal, a spring inside of said fuse tube for tensioning said fuse link to lengthen the arc on blowing thereof, and means for producing relative movement between said fuse tube and said sleeve after said fuse link blows to disengage one of said fuse terminals from its stationary terminal, the tension upon said fuse link before blowing being independent of the means for producing relative movement between said fuse tube and said sleeve member.

73. In combination, a contact terminal, a fuse comprising a fuse tube having a contact engageable with said contact terminal; a replaceable fuse link assembly for said tube including an insulating sleeve, fusible means within said sleeve, and a spring for tensioning said fusible means and extending the arc formed on blowing thereof; and means operable on blowing of said fusible means for effecting movement of said fuse out of engagement with said contact terminal and to open position to interpose an air dielectric therebetween.

74. A circuit interrupter comprising, upper and lower line terminals, a fuse tube having terminals at its ends for engaging said line terminals and biased away from said upper terminal, means holding the upper fuse tube terminal in contact engagement with said upper line terminal, spring means biasing said holding means toward released position, and a fuse link in said fuse tube interconnecting said fuse tube terminals and restraining said holding means, said fuse link including a fusible element and a parallel strain element to relieve the fusible element of the stress applied by said spring means in biasing said holding means to released position.

75. A circuit interrupter comprising, upper and lower line terminals, a fuse tube having terminals at its ends for engaging said line terminals and biased away from said upper terminal, means holding the upper fuse tube terminal in contact engagement with said upper line terminal, spring means biasing said holding means toward released position, and a replaceable fuse link assembly for said fuse tube interconnecting said fuse tube terminals and controlling said holding means, said fuse link assembly including an insulating sleeve, fusible means within said sleeve, and a spring for tensioning said fusible means and extending the arc formed on blowing thereof.

76. A circuit interrupter comprising, upper and lower line terminals, a fuse tube having terminals at its ends for engaging said line terminals and biased away from said upper terminal, means holding the upper fuse tube terminal in contact engagement with said upper line terminal, spring means biasing said holding means toward released position, and a fuse link adapted to be inserted in said fuse tube for interconnecting said fuse tube terminals and controlling said holding means, said fuse link including upper and lower terminals interconnected by fusible means, said upper fuse link terminal being adapted to be connected to said upper fuse tube terminal, and a stranded flexible conductor extending from the lower fuse link terminal for connection to the lower fuse tube terminal.

77. A circuit interrupter comprising, upper and lower line terminals, a fuse tube having terminals at its ends for engaging said line terminals and biased away from said upper terminal, means holding the upper fuse tube terminal in contact engagement with said upper line terminal, spring means biasing said holding means toward released position; a fuse link adapted to be inserted in said fuse tube for interconnecting said fuse tube terminals and controlling said holding means, said fuse link including a sleeve of insulation, a terminal at the upper end of said sleeve adapted to be connected to said upper fuse tube terminal, conductor means extending out of the lower end of said sleeve having a terminal at its upper end connected by fusible means to said upper fuse link terminal and a stranded flexible conductor at its lower end for connection to the lower fuse tube terminal; and screw clamp means on said lower fuse tube terminal for securing said stranded flexible conductor thereto.

78. A circuit interrupter comprising, upper and lower terminal members, a fuse having a tubular body portion latched to said upper terminal member and pivoted to said lower terminal member, a fuse link within said tubular body portion including a fusible element and a parallel strain element, and means mechanically controlled by the tension of said fuse link for unlatching the upper portion when said fuse blows, said strain element relieving said fusible element of the tension applied to said fuse link by said unlatching means.

79. A circuit interrupter comprising, upper and lower terminal members, a fuse having a tubular body portion latched to said upper terminal member and pivoted to said lower terminal member; a replaceable fuse link assembly for said tubular body portion including an insulating sleeve, fusible means within said sleeve, and a spring for tensioning said fusible means and extending the arc formed on blowing thereof; and means mechanically controlled by the tension of said fuse link assembly for unlatching the upper portion of said fuse when said fusible means blows.

80. In combination, a pair of line terminals mounted in insulated spaced relation, a fuse device for interconnecting said terminals including a fuse tube and a metallic sleeve, said fuse tube and sleeve being biased for relative movement to effect disconnection of said fuse device from one of said line terminals, and a replaceable fuse link for said fuse tube arranged to prevent said relative movement and including a fusible element and a parallel strain element to relieve the fusible element of the stress incident to the force relatively biasing said fuse tube aand sleeve.

81. In combination, a pair of line terminals mounted in insulated spaced relation, a fuse device for interconnecting said terminals including a fuse tube and a metallic sleeve, said fuse tube and sleeve being biased for relative movement to effect disconnection of said fuse device from one of said line terminals, and a replaceable fuse link for said fuse tube arranged to prevent said relative movement and including a sleeve of insulation, terminals therein, and a fusible element and a parallel strain element interconnecting the fuse link terminals, said strain element relieving the fusible element of the stress incident to the force relatively biasing said fuse tube and sleeve.

82. In combination, a pair of line terminals mounted in insulated spaced relation, a fuse device for interconnecting said terminals including a fuse tube and a metallic sleeve, said fuse tube and sleeve being biased for relative movement to effect disconnection of said fuse device from one of said line terminals, and a replaceable fuse link for said fuse tube arranged to prevent said relative movement and including a sleeve of insulation, terminals therein, fusible means interconnecting said terminals, and a spring tensioning said fusible means and acting to separate said terminals to extend the arc formed therebetween on blowing of said fusible means.

83. A circuit interrupter comprising, a fuse tube having terminals at its ends; a replaceable fuse link assembly in said fuse tube including a pair of spaced link terminals interconnected by fusible means, a spring and cable assembly interconnecting one link terminal and one fuse tube terminal, and a flexible conductor extending from the other link terminal for connection to the other fuse tube terminal; means on said other fuse tube terminal interfitting with means on said fuse link assembly for locating the same in a predetermined position with a predetermined tension applied thereto by the spring of said spring and cable assembly, and clamp means on said other terminal for securing said flexible conductor thereto independently of said interfitting means.

84. A circuit interrupter comprising, a fuse tube having terminals at its ends; a replaceable fuse link assembly in said fuse tube including a pair of spaced link terminals interconnected by fusible means, a spring and cable assembly interconnecting one link terminal and one fuse tube terminal, a flexible conductor extending from the other link terminal for connection to the other fuse tube terminal, and an abutment member secured to said flexible conductor intermediate its ends; means on said other fuse tube terminal interfitting with said abutment member for locating said fuse link assembly in a predetermined position with a predetermined tension applied thereto by the spring of said spring and cable assembly, and clamp means on said other terminal for securing said flexible conductor thereto independently of said abutment member and interfitting means.

85. A circuit interrupter comprising, upper and lower line terminals, a fuse tube having terminals at its ends for engaging said line terminals and biased away from said upper terminal, means holding the upper fuse tube terminal in contact engagement with said upper line terminal, spring means biasing said holding means toward released position; a replaceable fuse link assembly in said fuse tube for interconnecting said fuse tube terminals and controlling said holding means, said fuse link assembly including a pair of spaced link terminals interconnected by fusible means, a spring and cable assembly interconnecting one link terminal and the upper fuse tube terminal, and a flexible conductor extending from the other link terminal for connection to the lower fuse tube terminal, means on said lower fuse tube terminal interfitting with means on said fuse link assembly for locating the same in a predetermined position with a predetermined tension applied thereto by the spring of said spring and cable assembly, and clamp means on said lower terminal for securing said flexible conductor thereto independently of said interfitting means.

86. A circuit interrupter comprising, upper and lower line terminals, a fuse tube having terminals at its ends for engaging said line terminals and biased away from said upper terminal, means holding the upper fuse tube terminal in contact engagement with said upper line terminal, spring means biasing said holding means toward released position; a replaceable fuse link assembly in said fuse tube for interconnecting said fuse tube terminals and controlling said holding means, said fuse link assembly including a pair of spaced link terminals interconnected by fusible means, a spring and cable assembly interconnecting one link terminal and the upper fuse tube terminal, a flexible conductor extending from the other link terminal for connection to the lower fuse tube terminal, and an abutment member secured to said flexible conductor intermediate its ends; means on said lower fuse tube terminal interfitting with said abutment member for locating said fuse link assembly in a predetermined position with a predetermined tension applied thereto by the spring of said spring and cable assembly, and clamp means on said lower fuse tube terminal for securing said flexible conductor thereto independently of said abutment member and interfitting means.

87. In combination, a fuse terminal, a bar portion integrally formed therewith, a U-shaped bolt hooked over said bar portion, and a nut threaded on said U-shaped bolt for clamping a conductor in said U-shaped bolt to said bar portion.

88. In combination, a cast fuse terminal having a bar portion cast integrally therewith for receiving a conductor to connect the fuse to a circuit, a U-shaped bolt interfitting with said bar portion and said conductor, and a nut threaded on said U-shaped bolt for clamping said conductor to said bar portion.

89. In combination, a cast fuse terminal having a bail portion cast integrally therewith with the central portion thereof spaced therefrom for receiving a conductor to connect the fuse to a circuit, a U-shaped bolt interfitting with said conductor and said bail portion and adapted to assume various positions therealong, and a nut threaded on said U-shaped bolt for clamping said conductor to said bail portion.

90. In combination, a metallic bracket carrying a contact engaging portion, a connector portion rigidly attached to said bracket, a U-shaped bolt hooked over said connector portion, and a nut threaded on said U-shaped bolt for clamping a conductor in said U-shaped bolt to said connector portion.

91. In a line terminal assembly for a cutout adapted to be mounted out of doors and to receive a line conductor from various angles for connection thereto, in combination, a cast metallic bracket, a contact member carried by said bracket for engaging a terminal of the cutout, a bar portion cast integrally with said bracket, a U-shaped bolt interfitting with said bar portion and said conductor, and a nut threaded on said U-shaped bolt for clamping said line conductor to said bar portion.

92. In combination, a pair of cast fuse terminals having a fuse tube therebetween and each having a bar portion cast integrally therewith for receiving line conductors to connect the fuse in a circuit, a U-shaped bolt interfitting with each bar portion and the line conductor associated therewith, and a nut threaded on each U-shaped bolt for clamping the respective line conductor in place.

93. In combination, a pair of cast fuse terminals in insulated spaced relation and each having a contact portion, a fuse tube having spaced contact means for engaging said contact portions, a bar portion cast integrally with each fuse terminal for receiving a line conductor to connect the fuse in a circuit, a U-shaped bolt interfitting with each bar portion and the line conductor associated therewith, and a nut threaded on each U-shaped bolt for clamping the respective line conductor in place.

94. In a device of the class described, the combination of a dropout fuse pivotally mounted at its lower end and latched in operative position, said dropout fuse being adapted to be unlatched on blowing thereof and released for downward swinging movement, a switch lever pivotally mounted adjacent the pivot axis of said fuse and having means adapted to be engaged thereby when the same swings downwardly for moving the lever angularly, yielding friction means for holding said lever in any selected position, and a separately supported switch jaw adapted to be engaged by said lever as it is actuated by said fuse.

95. In a device of the class described, the combination of a dropout fuse pivotally mounted at its lower end and latched in operative position, said dropout fuse being adapted to be unlatched on blowing thereof and released for downward swinging movement, a switch lever pivotally mounted adjacent the pivot axis of said fuse and having means adapted to be engaged thereby when the same swings downwardly for moving the lever angularly, yielding friction means for holding said lever in any selected position, an actuating eye member forming a part of said lever for shifting it by means of a switch hook, and a separately supported switch jaw adapted to be engaged by said lever as it is actuated by said fuse.

96. In a repeating fuse mechanism, in combination, a pair of rotatably mounted dropout fuse devices one of which is normally adapted to be connected in a circuit, and a transfer switch actuated by movement of said one fuse device on blowing of its fusible element to connect the other fuse device in said circuit, said transfer switch comprising a stationary contact member, a cooperating contact member movable into engagement with said stationary contact member from underneath, and yielding friction means for holding said contact member in any selected position.

97. A dropout fuse construction comprising, in combination, a pair of line terminals in insulated spaced relation, a fuse tube having terminals at its ends latched in engagement with said line terminals and biased to open circuit position, fusible means in said fuse tube restraining unlatching of said fuse tube until the same blows, spring means tensioning said fusible means, and means moved by said spring means into which kinetic energy is imparted on blowing of said fusible means for striking a hammer-like blow to assist in unlatching said fuse tube.

98. A dropout fuse construction comprising, in combination, a pair of line terminals in insulated spaced relation, a fuse tube having terminals at its ends adapted to engage said line terminals and biased to open circuit position, means pivotally mounting said fuse tube at one end, means latching said fuse tube in closed circuit position at the other end, a fuse link at said one end of said fuse tube, spring means tensioning said fuse link, and means moved by said spring means into which kinetic energy is imparted on blowing of said fuse link for striking a hammer-like blow on said latch means to assist in unlatching said fuse tube.

99. A dropout fuse construction comprising, in combination, a pair of line terminals in insulated spaced relation, a fuse tube having terminals at its ends adapted to engage said line terminals and biased to open circuit position, means pivotally mounting said fuse tube at one end, means latching said fuse tube in closed circuit position at the other end, a fuse link at said one end of said fuse tube, restraining said latching means until the same blows whereupon an arc is formed at said one end of said fuse tube, a terminal secured to the inner end of said fuse link, and a coil tension spring in said fuse tube interconnecting said terminal and said latching means and tensioning said fuse link, said tension spring being released on blowing of said fuse link to extend said arc and imparting kinetic energy into itself and to said terminal which is dissipated in striking a hammer-blow on said latching means for assisting in releasing the same.

100. A fuse construction comprising, in combination, a fuse tube having a fuse link at one end and a member movable endwise at the other end, flexible conducting means interconnecting said fuse link and said member, and spring means restrained by said fuse link until the same blows and adapted to impart kinetic energy into the moving parts associated therewith which is dissipated in striking a hammer-like blow on said member to effect said endwise movement thereof.

ALLAN RAMSEY.